United States Patent
Mizuhata et al.

(10) Patent No.: US 9,190,678 B2
(45) Date of Patent: Nov. 17, 2015

(54) ALKALINE FUEL CELL AND ALKALINE FUEL CELL SYSTEM

(75) Inventors: Hirotaka Mizuhata, Osaka (JP); Shunsuke Sata, Osaka (JP)

(73) Assignee: SHARP KABUSHIKI KAISHA, Osaka-shi, Osaka (JP)

( * ) Notice: Subject to any disclaimer, the term of this patent is extended or adjusted under 35 U.S.C. 154(b) by 511 days.

(21) Appl. No.: 13/594,940

(22) Filed: Aug. 27, 2012

(65) Prior Publication Data

US 2013/0052555 A1 Feb. 28, 2013

(30) Foreign Application Priority Data

Aug. 25, 2011 (JP) .................. 2011-183776
Aug. 25, 2011 (JP) .................. 2011-183778
Aug. 25, 2011 (JP) .................. 2011-183823

(51) Int. Cl.
*H01M 8/04* (2006.01)
*H01M 8/10* (2006.01)
*H01M 8/08* (2006.01)

(52) U.S. Cl.
CPC ...... *H01M 8/04186* (2013.01); *H01M 8/04029* (2013.01); *H01M 8/083* (2013.01); *H01M 8/0485* (2013.01); *H01M 8/1018* (2013.01); *Y02E 60/50* (2013.01)

(58) Field of Classification Search
CPC .................................................. H01M 8/083
See application file for complete search history.

(56) References Cited

U.S. PATENT DOCUMENTS

| | | | |
|---|---|---|---|
| 6,492,056 B1* | 12/2002 | Ovshinsky | 429/421 |
| 2006/0057436 A1* | 3/2006 | Osenar et al. | 429/12 |
| 2009/0075140 A1 | 3/2009 | Hashimoto et al. | |

FOREIGN PATENT DOCUMENTS

| | | |
|---|---|---|
| JP | 3-295175 | 12/1991 |
| JP | 4-12465 A | 1/1992 |
| JP | 2007-73243 A | 3/2007 |
| JP | 2007-250278 A | 9/2007 |
| JP | 2008-300215 A | 12/2008 |
| JP | 2010-123441 | 6/2010 |
| WO | WO 2009/149195 | 12/2009 |

OTHER PUBLICATIONS

Matsui et al., "Influence of Carbon Dioxide on the Performance of Anion-Exchange Membrane Fuel Cells", *ECS Transactions*, 25(13), 2010, pp. 105-110.
Yamazaki et al., "Direct Alcohol Fuel Cells Using an Anion Exchanging Electrolyte Membrane", *Research Report*, Jun. 2006, pp. 71-74.

(Continued)

*Primary Examiner* — Carlos Barcena
(74) *Attorney, Agent, or Firm* — Nixon & Vanderhye, P.C.

(57) ABSTRACT

Provided is an alkaline fuel cell, including: a membrane electrode assembly including an anion conductive electrolyte membrane, an anode electrode stacked on a first surface of the anion conductive electrolyte membrane, and a cathode electrode stacked on a second surface opposite to the first surface of the anion conductive electrolyte membrane; a first separator stacked on the anode electrode, at least including a fuel receiving portion for receiving a fuel; a second separator stacked on the cathode electrode, at least including an oxidant receiving portion for receiving an oxidant; and an alkaline aqueous solution supply portion for bringing an alkaline aqueous solution into contact with only the anion conductive electrolyte membrane of the membrane electrode assembly.

13 Claims, 10 Drawing Sheets

(56) References Cited

OTHER PUBLICATIONS

Nishikawa, "Technology for Fuel Cells: Problems and Countermeasures of Solid Polymer Type", *Tokyo Denki University Press*, Jun. 10, 2010, pp. 45-49 w/ partial translation.

"Guide for Clear Understanding of Fuel Cell" (partial English translation), National Institute of Advanced Industrial Science and Technology (AIST), Hakujitusha, first edition, Mar. 24, 2011, p. 233.

"Fuel Cell Materials", the Ceramic Society of Japan, the Nikkan Kogyo Shimbum, Ltd., Jan. 31, 2007, pp. 118-119.

* cited by examiner

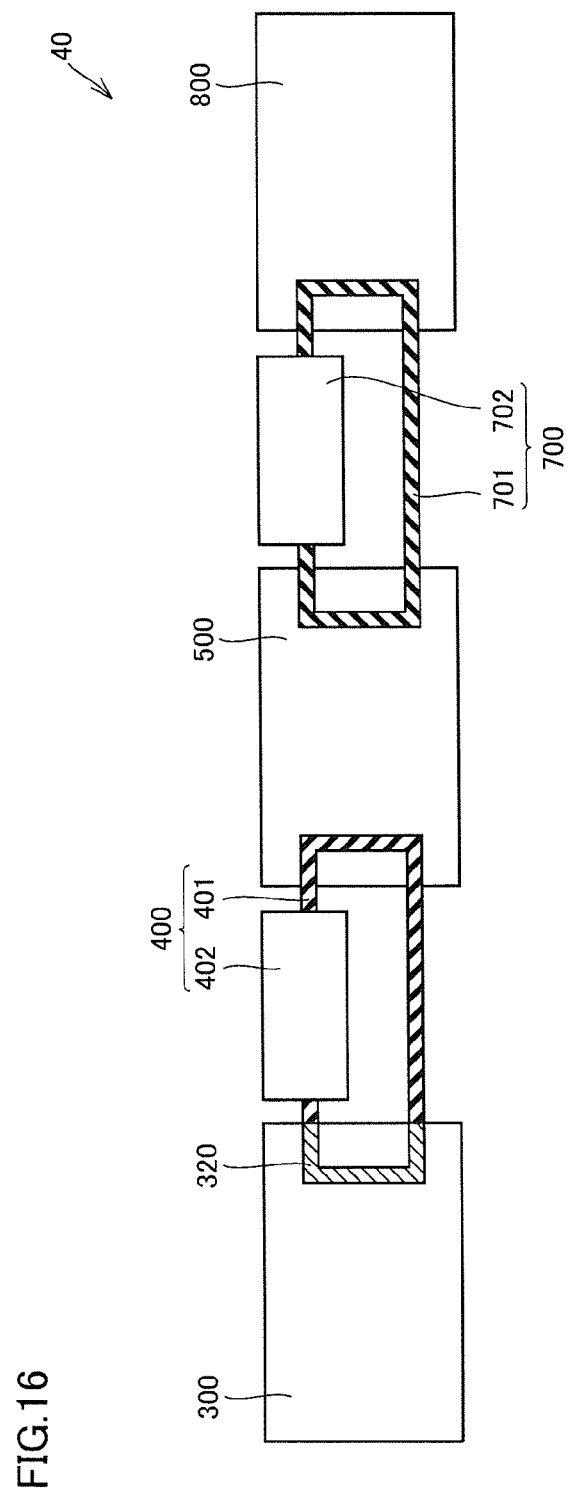

ALKALINE FUEL CELL AND ALKALINE FUEL CELL SYSTEM

This nonprovisional application is based on Japanese Patent Application Nos. 2011-183823, 2011-183778, and 2011-183776 filed on Aug. 25, 2011 with the Japan Patent Office, the entire contents of which are hereby incorporated by reference.

BACKGROUND OF THE INVENTION

1. Field of the Invention

The present invention relates to an alkaline fuel cell using an anion conductive electrolyte membrane (anion exchange membrane) as an electrolyte membrane, and an alkaline fuel cell system which can adjust a temperature of an alkaline fuel cell using a heat medium.

2. Description of the Background Art

Fuel cells have a possibility of achieving reduction in size and weight and high output density, and development of their application to a new power source for mobile electronic devices, to household cogeneration systems, and the like is aggressively promoted. A fuel cell includes, as a main portion for power generation, a membrane electrode assembly (MEA) formed by sandwiching an electrolyte membrane between an anode electrode and a cathode electrode. Depending on the type of the electrolyte membrane, fuel cells are classified into a solid polymer fuel cell (including a direct fuel cell), a phosphoric acid fuel cell, a molten carbonate fuel cell, a solid oxide fuel cell, an alkaline fuel cell, and the like.

An alkaline fuel cell is a fuel cell which uses an anion conductive electrolyte membrane (anion exchange membrane) as an electrolyte membrane and in which a hydroxide ion (OW) serves as a charge carrier. In the alkaline fuel cell, when an anode electrode and a cathode electrode are electrically connected, a current flows between the anode electrode and the cathode electrode by an electrochemical reaction described below, and thus electric energy can be obtained. Specifically, when an oxidant (for example, oxygen, air, or the like) and water are supplied to the cathode electrode, $OH^-$ is generated by a catalytic reaction represented by the following formula (1):

$$\text{cathode electrode: } 1/2O_2 + H_2O + 2e^- \rightarrow 2OH^- \qquad (1).$$

This $OH^-$ is transferred to the anode electrode through the electrolyte membrane, in a state hydrated with a water molecule. On the other hand, at the anode electrode, a supplied fuel (reductant), for example, $H_2$ gas, and $OH^-$ transferred from the cathode electrode cause a catalytic reaction represented by the following formula (2) to generate water and electrons:

$$\text{anode electrode: } H_2 + 2OH^- \rightarrow 2H_2O + 2e^- \qquad (2).$$

Since an anion conductive electrolyte is used as the electrolyte membrane and an electrolyte of a catalyst layer in the alkaline fuel cell, the electrolyte membrane and the catalyst layer absorb carbon dioxide ($CO_2$) in an atmosphere during suspension of operation, and $OH^-$ in the electrolyte membrane and the catalyst layer is substituted by $CO_3^{2-}$ and/or $HCO_3^-$ (hereinafter may be referred to as a "$CO_2$-derived anion") by a reaction represented by the following formulas (3) and (4):

$$CO_2 + 2OH^- \rightarrow CO_3^{2-} + H_2O \qquad (3)$$

$$CO_2 + OH^- \rightarrow HCO_3^- \qquad (4).$$

An increase in the concentration of such $CO_2$-derived anions (a decrease in $OH^-$ ion concentration) decreases anion conductivity of the electrolyte and significantly increases cell resistance.

It is known that the above problem of the increase in cell resistance can be improved by a phenomenon called self purge caused by operating the fuel cell. The self purge refers to a phenomenon in which, due to operation of the fuel cell, $CO_2$-derived anions contained in the electrolyte membrane and the catalyst layer and serving as a factor of the decrease in anion conductivity move to the anode electrode, are reduced by the fuel, and emitted as $CO_2$ gas from the anode electrode. The self purge can be specifically represented by the following formulas (5) and (6):

$$H_2 + CO_3^{2-} \rightarrow CO_2 + H_2O + 2e^- \qquad (5)$$

$$H_2 + 2HCO_3^- \rightarrow 2CO_2 + 2H_2O + 2e^- \qquad (6).$$

However, as described in ECS Transactions, 25(13), 105-110 (2010) by Yu Matsui, Morihiro Saito, Akimasa Tasaka, and Minoru Inaba [Non-Patent Literature 1], although the self purge can suppress an increase in cell resistance because many $CO_2$-derived anions are resubstituted by $OH^-$, $CO_2$-derived anions remaining in a certain amount are localized by the self purge at the anode electrode and accumulated therein, which causes a problem that reaction overpotential at the anode electrode is increased and power generation efficiency is decreased.

Japanese Patent Laying-Open No. 3-295175 [Patent Literature 1] describes removing carbon dioxide in a fuel supplied to an anode electrode by bringing the fuel into contact with an alkaline aqueous solution. Further, "Development of Anion Exchange Membrane Fuel Cells" by Yotaro Yamazaki, the Ministry of Education, Culture, Sports, Science and Technology Science Research Grant "New Development in Highly Efficient Energy Conversion with Low Environmental Load by DMFC" (Grant-in-Aid for Scientific Research on Priority Area B) Research Report, pp. 71-74, June 2006 [Non-Patent Literature 2] describes improving output characteristics by adding alkali beforehand to a fuel to be supplied to an anode electrode.

As indicated in the above formula (1), in the alkaline fuel cell, it is necessary to supply water to the cathode electrode for the catalytic reaction. In addition, it is also necessary to supply water to the electrolyte membrane to prevent drying of the electrolyte membrane and resultant increase in an anion conduction resistance. Conventionally, such water supply is generally performed by using a humidified fuel and/or oxidant as a fuel to be supplied to the anode electrode and/or an oxidant to be supplied to the cathode electrode. However, this method requires auxiliary equipment such as a humidifier, and results in a larger fuel cell.

International Publication No. 2009/149195 [Patent Literature 2] describes directly supplying liquid water (i.e., water in the form of a liquid) to a surface of an electrolyte membrane on a side facing a cathode electrode, as another water supply method (see, for example, page 28, line 18 to page 31, line 18, FIGS. 11 and 12). More specifically, in this method, an outer edge portion of a cathode-side electrode portion in a gasket is provided with a slot directly connected to the surface of the electrolyte membrane on the side facing the cathode electrode, and liquid water is directly supplied from the slot to the surface of the electrolyte membrane on the side facing the cathode electrode (page 31, lines 4 to 18, FIG. 11).

Meanwhile, fuel cells such as an alkaline fuel cell are generally adjusted in an appropriate temperature range during power generation, considering increase in the efficiency of the above catalytic reaction (electrochemical reaction) and prevention of thermal deterioration of fuel cell components such as an electrolyte membrane. One of conventional examples of a temperature adjustment method is to place a heater in a fuel cell. However, since temperature adjustment by the heater cannot perform cooling, it is inevitable that the fuel cell has a high temperature, particularly when the fuel cell generates a large amount of heat, such as when a large current is drawn from the fuel cell.

"Technology for Fuel Cells: Problems and Countermeasures of Solid Polymer Type" written by Hisao Nishikawa, Tokyo Denki University Press, 2010, pp. 45-46 [Non-Patent Literature 3] describes passing cooling water through a flow channel provided inside a separator, as a method for cooling a fuel cell (page 46, FIG. 3.22). It is noted that the wording "provided inside a separator" used herein means that the flow channel is not open to a membrane electrode assembly, and is provided inside the separator in a state separated from the membrane electrode assembly.

SUMMARY OF THE INVENTION

As described in Patent Literature 1 and Non-Patent Literature 2, with the method of supplying an alkaline aqueous solution to an anode electrode to neutralize $CO_2$-derived anions with alkali, there is a possibility that accumulation of the $CO_2$-derived anions into the anode electrode can be suppressed. However, this method causes a new problem that salt (such as carbonate) generated by neutralization precipitates within pores in the anode electrode and blocks the pores, and thus supply and diffusion of a fuel to the anode electrode are inhibited and power generation efficiency is decreased. Further, when a gas fuel such as hydrogen is used, supply of the gas fuel is inhibited by blockage of the pores by the alkaline aqueous solution itself.

On the other hand, in the case of the water supply method described in Patent Literature 2, the liquid water supplied to the surface of the electrolyte membrane on the side facing the cathode electrode penetrates under the gasket covering a peripheral edge portion of the electrolyte membrane, laterally moves along an interface between the electrolyte membrane and a cathode catalyst layer, and penetrates into the cathode catalyst layer from the interface. As a result, flooding in which film-like liquid water blocks pores in the cathode catalyst layer occurs, causing problems such as decreased power generation efficiency and decreased output stability.

Further, in the method of performing temperature adjustment by providing a heat medium flow channel inside a separator of a fuel cell and passing a heat medium therethrough as described in Non-Patent Literature 3, heat is always conducted through the separator, and thus there are caused problems such as low heat exchange efficiency (therefore, a long period of time required until the fuel cell reaches a desired temperature) and poor accuracy of temperature adjustment. In addition, when the heat medium flow channel is formed inside the separator, the structure becomes complicated, thus causing increased manufacturing cost and complicated manufacturing process.

The present invention has been made in view of the above problems, and its first object is to provide an alkaline fuel cell which can effectively suppress accumulation of $CO_2$-derived anions into an anode electrode without causing blockage of pores in the electrode, and thus exhibits good power generation efficiency.

A second object of the present invention is to provide an alkaline fuel cell which can supply liquid water to an electrolyte membrane while preventing direct supply of the liquid water to electrodes (cathode electrode and anode electrode), and thus exhibits good power generation characteristics.

A third object of the present invention is to provide an alkaline fuel cell system adjusting a temperature of an alkaline fuel cell using a heat medium, which can adjust the temperature with high heat exchange efficiency and high accuracy while maintaining good power generation characteristics.

To achieve the first object described above, the present invention provides an alkaline fuel cell (X), including: a membrane electrode assembly including an anion conductive electrolyte membrane, an anode electrode stacked on a first surface of the anion conductive electrolyte membrane, and a cathode electrode stacked on a second surface opposite to the first surface of the anion conductive electrolyte membrane; a first separator stacked on the anode electrode, at least including a fuel receiving portion for receiving a fuel; a second separator stacked on the cathode electrode, at least including an oxidant receiving portion for receiving an oxidant; and an alkaline aqueous solution supply portion for bringing an alkaline aqueous solution into contact with only the anion conductive electrolyte membrane of the membrane electrode assembly.

Preferably, the alkaline aqueous solution supply portion includes at least one of a first alkaline aqueous solution supply portion and a second alkaline aqueous solution supply portion, the first alkaline aqueous solution supply portion being provided for bringing the alkaline aqueous solution into contact with only the first surface of the anion conductive electrolyte membrane of the membrane electrode assembly, the second alkaline aqueous solution supply portion being provided for bringing the alkaline aqueous solution into contact with only the second surface of the anion conductive electrolyte membrane of the membrane electrode assembly.

The first alkaline aqueous solution supply portion can include a first concave portion provided in a surface of the first separator on a side facing the anion conductive electrolyte membrane, and a first space interposed between the first concave portion and the anion conductive electrolyte membrane, and sandwiched between first walls provided at peripheral edges of the space to extend from the surface of the first separator on the side facing the anion conductive electrolyte membrane to the first surface of the anion conductive electrolyte membrane.

Further, the second alkaline aqueous solution supply portion can include a second concave portion provided in a surface of the second separator on a side facing the anion conductive electrolyte membrane, and a second space interposed between the second concave portion and the anion conductive electrolyte membrane, and sandwiched between second walls provided at peripheral edges of the space to extend from the surface of the second separator on the side facing the anion conductive electrolyte membrane to the second surface of the anion conductive electrolyte membrane.

Preferably, the fuel receiving portion includes a third concave portion provided in the surface of the first separator on the side facing the anion conductive electrolyte membrane, and the first concave portion is a concave portion independent from the third concave portion, provided in at least a portion of a periphery of the third concave portion. Preferably, the oxidant receiving portion includes a fourth concave portion provided in the surface of the second separator on the side facing the anion conductive electrolyte membrane, and the second concave portion is a concave portion independent from the fourth concave portion, provided in at least a portion of a periphery of the fourth concave portion.

The first separator and the second separator can have a current collecting function.

According to the alkaline fuel cell (X) in accordance with the present invention, since the alkaline fuel cell (X) includes the alkaline aqueous solution supply portion configured to bring the alkaline aqueous solution into contact with only the anion conductive electrolyte membrane of the membrane electrode assembly, accumulation of $CO_2$-derived anions into the anode electrode can be effectively suppressed by neutralization by the alkaline aqueous solution, and blockage of pores in the electrode due to salt generated by the neutralization does not occur. Therefore, the alkaline fuel cell (X) in accordance with the present invention can exhibit excellent power generation efficiency.

Further, to achieve the second object described above, the present invention provides an alkaline fuel cell (Y), including: a membrane electrode assembly including an anion conductive electrolyte membrane, an anode electrode stacked on a first surface of the anion conductive electrolyte membrane, and a cathode electrode stacked on a second surface opposite to the first surface of the anion conductive electrolyte membrane; a first separator stacked on the anode electrode, at least including a fuel receiving portion for receiving a fuel; a second separator stacked on the cathode electrode, at least including an oxidant receiving portion for receiving an oxidant; and a liquid water supply flow channel for supplying liquid water to the anion conductive electrolyte membrane.

Here, the liquid water supply flow channel includes a space in contact with only the anion conductive electrolyte membrane of the membrane electrode assembly. The space is interposed between the first separator or the second separator and the anion conductive electrolyte membrane, and sandwiched between elastic walls provided at peripheral edges of the space to extend from a surface of the first separator or the second separator on a side facing the anion conductive electrolyte membrane to the surface of the anion conductive electrolyte membrane.

Preferably, the liquid water supply flow channel includes at least one of a first liquid water supply flow channel and a second liquid water supply flow channel, the first liquid water supply flow channel including a first space in contact with only the first surface of the anion conductive electrolyte membrane of the membrane electrode assembly, the first space being interposed between the first separator and the anion conductive electrolyte membrane, and sandwiched between first elastic walls provided at peripheral edges of the space to extend from the surface of the first separator on the side facing the anion conductive electrolyte membrane to the first surface of the anion conductive electrolyte membrane, the second liquid water supply flow channel including a second space in contact with only the second surface of the anion conductive electrolyte membrane of the membrane electrode assembly, the second space being interposed between the second separator and the anion conductive electrolyte membrane, and sandwiched between second elastic walls provided at peripheral edges of the space to extend from the surface of the second separator on the side facing the anion conductive electrolyte membrane to the second surface of the anion conductive electrolyte membrane.

The first liquid water supply flow channel can include a first concave portion provided in the surface of the first separator on the side facing the anion conductive electrolyte membrane, and the first space interposed between the first concave portion and the anion conductive electrolyte membrane. The second liquid water supply flow channel can include a second concave portion provided in the surface of the second separator on the side facing the anion conductive electrolyte membrane, and the second space interposed between the second concave portion and the anion conductive electrolyte membrane.

Preferably, the fuel receiving portion includes a third concave portion provided in the surface of the first separator on the side facing the anion conductive electrolyte membrane, and the first concave portion is a concave portion independent from the third concave portion, provided in at least a portion of a periphery of the third concave portion. Preferably, the oxidant receiving portion includes a fourth concave portion provided in the surface of the second separator on the side facing the anion conductive electrolyte membrane, and the second concave portion is a concave portion independent from the fourth concave portion, provided in at least a portion of a periphery of the fourth concave portion.

The first separator and the second separator can have a current collecting function.

According to the alkaline fuel cell (Y) in accordance with the present invention, since the alkaline fuel cell (Y) includes the liquid water supply flow channel supplying the liquid water to the electrolyte membrane and supplying moisture to the cathode electrode through the electrolyte membrane while preventing direct supply of the liquid water to the electrodes, it can supply the liquid water without causing flooding, and thus can exhibit good power generation characteristics.

Regarding the third object of the present invention described above, in conventional temperature adjustment using a heat medium, the passing heat medium is prevented from coming into contact with a membrane electrode assembly by providing a heat medium flow channel inside a separator, due to the following reasons, according to the view of the inventors of the present invention:

(a) If the heat medium is directly supplied to the electrodes of the membrane electrode assembly, blockage of pores in the electrodes as represented by flooding occurs, and power generation efficiency and output stability of the fuel cell are decreased;

(b) If the heat medium is directly brought into contact with the membrane electrode assembly, the membrane electrode assembly is deteriorated by a minute amount of impurities (such as metal cations) in the heat medium.

The inventors of the present invention have arrived at an idea that, in order to achieve the third object described above in an alkaline fuel cell while considering (a) and (b) described above, it is effective to bring a heat medium into contact with only an anion conductive electrolyte membrane (anion exchange membrane) without bringing it into contact with electrodes, because this allows direct adjustment of the temperature of the anion conductive electrolyte membrane, which serves as a main member for performing power generation, by the heat medium without causing problems such as (a) and (b) described above, and thus improvement in heat exchange efficiency and accuracy of temperature adjustment is expected. It is noted that, regarding (b) described above, in the alkaline fuel cell using the anion conductive electrolyte membrane (anion exchange membrane), even if the heat medium is brought into contact with the anion conductive electrolyte membrane, metal cations as impurities do not enter the electrolyte membrane by the nature of the electrolyte membrane, and thus deterioration due to the metal cations does not occur. The present invention has been completed after repeated consideration including verification of its effect, based on the above idea.

Specifically, to achieve the third object described above, the present invention provides an alkaline fuel cell system, including: an alkaline fuel cell including a membrane electrode assembly including an anion conductive electrolyte membrane, an anode electrode stacked on a first surface of the anion conductive electrolyte membrane, and a cathode electrode stacked on a second surface opposite to the first surface of the anion conductive electrolyte membrane, a first separator stacked on the anode electrode, at least including a fuel receiving portion for receiving a fuel, a second separator stacked on the cathode electrode, at least including an oxidant receiving portion for receiving an oxidant, and an inner-cell heat medium flow channel for bringing a first heat medium into contact with only the anion conductive electrolyte membrane of the membrane electrode assembly; a first heat medium circulation portion including an outer-cell heat medium flow channel connected to the inner-cell heat medium flow channel, for circulating the first heat medium in a first heat medium flow channel including the inner-cell heat medium flow channel and the outer-cell heat medium flow channel; and a first heat exchange portion for performing heat exchange with the first heat medium within the outer-cell heat medium flow channel.

Preferably, the inner-cell heat medium flow channel includes at least one of a first inner-cell heat medium flow channel and a second inner-cell heat medium flow channel, the first inner-cell heat medium flow channel being provided for bringing the first heat medium into contact with only the first surface of the anion conductive electrolyte membrane of the membrane electrode assembly, the second inner-cell heat medium flow channel being provided for bringing the first heat medium into contact with only the second surface of the anion conductive electrolyte membrane of the membrane electrode assembly.

The first inner-cell heat medium flow channel can include a first concave portion provided in a surface of the first separator on a side facing the anion conductive electrolyte membrane, and a first space interposed between the first concave portion and the anion conductive electrolyte membrane, and sandwiched between first walls provided at peripheral edges of the space to extend from the surface of the first separator on the side facing the anion conductive electrolyte membrane to the first surface of the anion conductive electrolyte membrane. The second inner-cell heat medium flow channel can include a second concave portion provided in a surface of the second separator on a side facing the anion conductive electrolyte membrane, and a second space interposed between the second concave portion and the anion conductive electrolyte membrane, and sandwiched between second walls provided at peripheral edges of the space to extend from the surface of the second separator on the side facing the anion conductive electrolyte membrane to the second surface of the anion conductive electrolyte membrane.

Preferably, the fuel receiving portion includes a third concave portion provided in the surface of the first separator on the side facing the anion conductive electrolyte membrane, and the first concave portion is a concave portion independent from the third concave portion, provided in at least a portion of a periphery of the third concave portion. Preferably, the oxidant receiving portion includes a fourth concave portion provided in the surface of the second separator on the side facing the anion conductive electrolyte membrane, and the second concave portion is a concave portion independent from the fourth concave portion, provided in at least a portion of a periphery of the fourth concave portion.

The first separator and the second separator can have a current collecting function.

Preferably, the alkaline fuel cell system in accordance with the present invention further includes a temperature detection portion for detecting at least one of temperatures within the alkaline fuel cell and within the first heat exchange portion. Preferably, the alkaline fuel cell system further includes a control portion for controlling an amount of heat exchange by the first heat exchange portion and/or controlling a circulation flow rate of the first heat medium circulated in the first heat medium flow channel, based on a result of detection by the temperature detection portion.

In one preferable embodiment, the first heat exchange portion includes a heating heat exchange portion for heating the first heat medium and a cooling heat exchange portion for cooling the first heat medium, switchably connected to the outer-cell heat medium flow channel.

In another preferable embodiment, the alkaline fuel cell system in accordance with the present invention further includes a second heat medium circulation portion including a second heat medium flow channel for circulating a second heat medium in the first heat exchange portion, and a second heat exchange portion for performing heat exchange with the second heat medium within the second heat medium flow channel.

The first heat medium is preferably a liquid, and more preferably water or an aqueous solution.

According to the alkaline fuel cell system in accordance with the present invention, the temperature of the alkaline fuel cell can be adjusted with high heat exchange efficiency and high accuracy, using the heat medium, while maintaining good power generation characteristics.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 16 is a schematic view showing still another example of the alkaline fuel cell system in accordance with the present invention.

DESCRIPTION OF THE PREFERRED EMBODIMENTS

Alkaline Fuel Cell (X)

Figure 1:
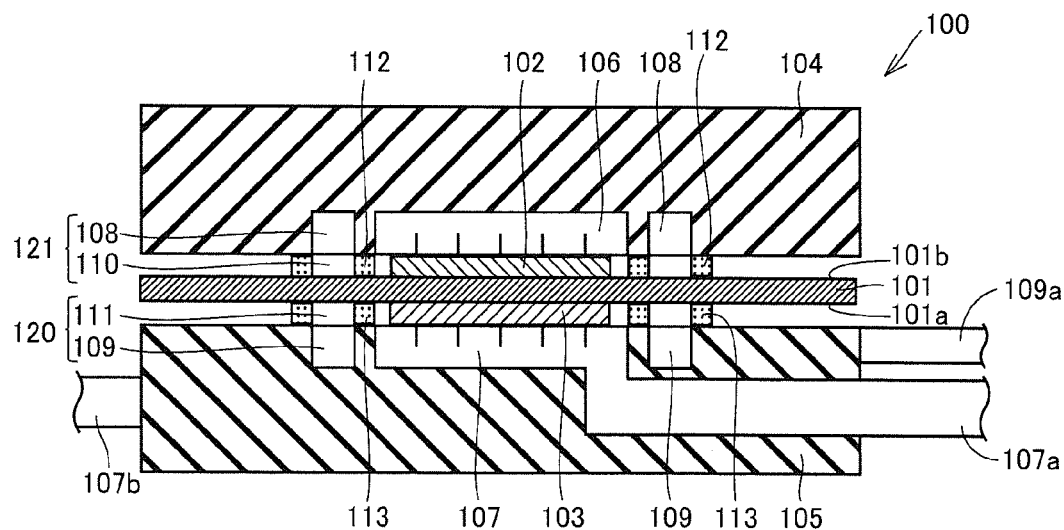
FIG. 1 is a schematic cross sectional view showing a preferable example of an alkaline fuel cell (X) in accordance with the present invention.

An alkaline fuel cell (X) in accordance with the present invention includes: a membrane electrode assembly including an anode electrode, an anion conductive electrolyte membrane, and a cathode electrode; a first separator stacked on the anode electrode, at least including a fuel receiving portion for receiving a fuel; and a second separator stacked on the cathode electrode, at least including an oxidant receiving portion for receiving an oxidant, and further includes an alkaline aqueous solution supply portion for supplying an alkaline aqueous solution to the anion conductive electrolyte membrane. The alkaline aqueous solution supply portion is configured to bring the alkaline aqueous solution into contact with and supply it to only the anion conductive electrolyte membrane of the membrane electrode assembly, without bringing the alkaline aqueous solution into contact with the anode electrode and the cathode electrode.

With the alkaline fuel cell (X) in accordance with the present invention, since the alkaline aqueous solution can be brought into contact with only the anion conductive electrolyte membrane (anion exchange membrane), without being brought into contact with the electrodes (the anode electrode and the cathode electrode), accumulation of $CO_2$-derived anions into the anode electrode can be suppressed by decreasing the concentration of $CO_2$-derived anions in the anion conductive electrolyte membrane, and thus decreasing the concentration of $CO_2$-derived anions in the electrodes, without causing blockage of pores in the electrodes due to precipitation of salt, and thereby power generation efficiency can be improved. Further, since the fuel cell can be operated from a state where $CO_2$-derived anions are not accumulated, starting performance can be enhanced, and sufficiently high electric power can be obtained from the beginning of power generation.

When the alkaline aqueous solution is brought into contact with the anion conductive electrolyte membrane, due to the nature of the anion conductive electrolyte membrane, counter cations of alkali do not enter the anion conductive electrolyte membrane, and only OFF anions enter the anion conductive electrolyte membrane. The OH⁻ anions effectively neutralize the $CO_2$-derived anions (such as carbonate ions) in the anion conductive electrolyte membrane, and thus the $CO_2$-derived anions in the anode electrode and the cathode electrode adjacent thereto. Neutralization used herein means that $CO_2$-derived anions are substituted by OFF anions. Salt generated by neutralization (i.e., salt made of the counter cations and the $CO_2$-derived anions) is dissolved in the alkaline aqueous solution, and the $CO_2$-derived anions are substantially separated from the membrane electrode assembly. When the alkaline aqueous solution is passed as in an embodiment described later, that is, when the alkaline aqueous solution is introduced from one end of the alkaline aqueous solution supply portion and emitted from the other end thereof, the salt generated by neutralization can also be emitted to the outside of the fuel cell together with the alkaline aqueous solution. Since the counter cations of alkali do not enter the anion conductive electrolyte membrane, precipitation of salt does not occur in the anion conductive electrolyte membrane.

In addition, the alkaline fuel cell (X) in accordance with the present invention is also advantageous in the following point. Specifically, water can be supplied to the anion conductive electrolyte membrane by bring the alkaline aqueous solution into contact with the anion conductive electrolyte membrane. Since the water can be utilized in the catalytic reaction at the cathode electrode (the above formula (1)), humidification of an oxidant (such as air) to be supplied to the cathode electrode (therefore, installation of a humidifier) can be omitted. Further, since a path for supplying the oxidant (the oxidant receiving portion) is separated from a path for supplying the water to the cathode electrode (the alkaline aqueous solution supply portion) on this occasion, shortage of supply of the oxidant due to flooding can be suppressed.

Hereinafter, the alkaline fuel cell (X) in accordance with the present invention will be described in detail with reference to an embodiment.

Figure 2:
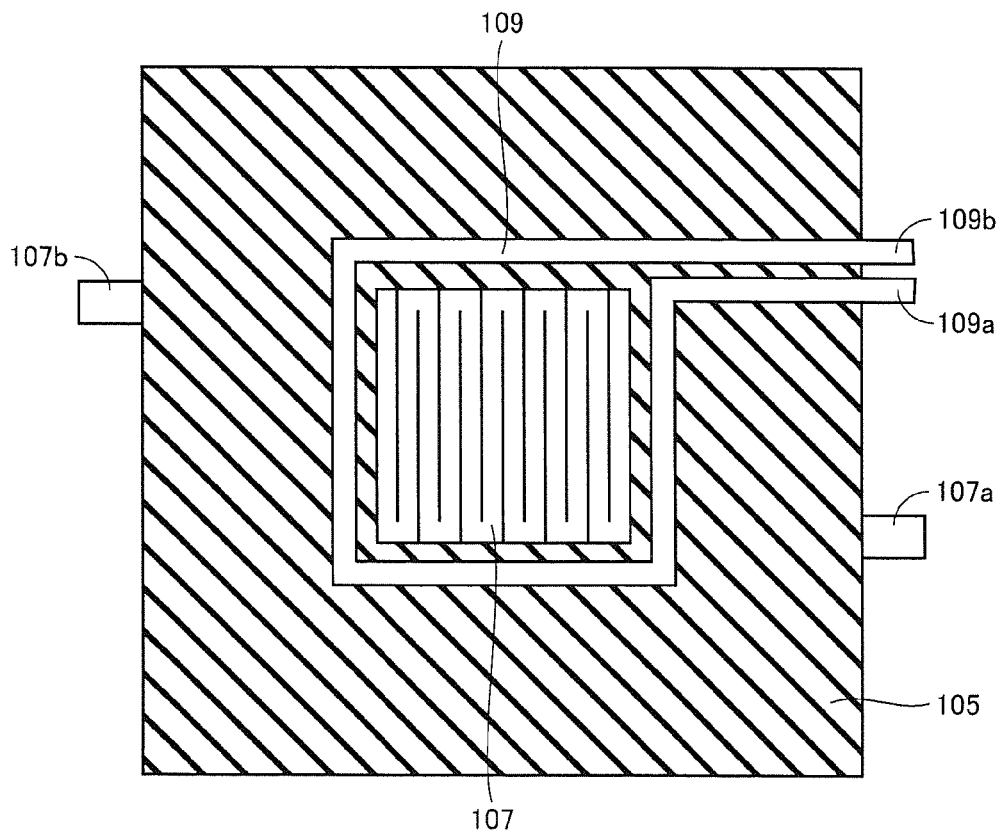
FIG. 2 is a schematic top view showing a first separator constituting the alkaline fuel cell (X) shown in FIG. 1.
Figure 3:
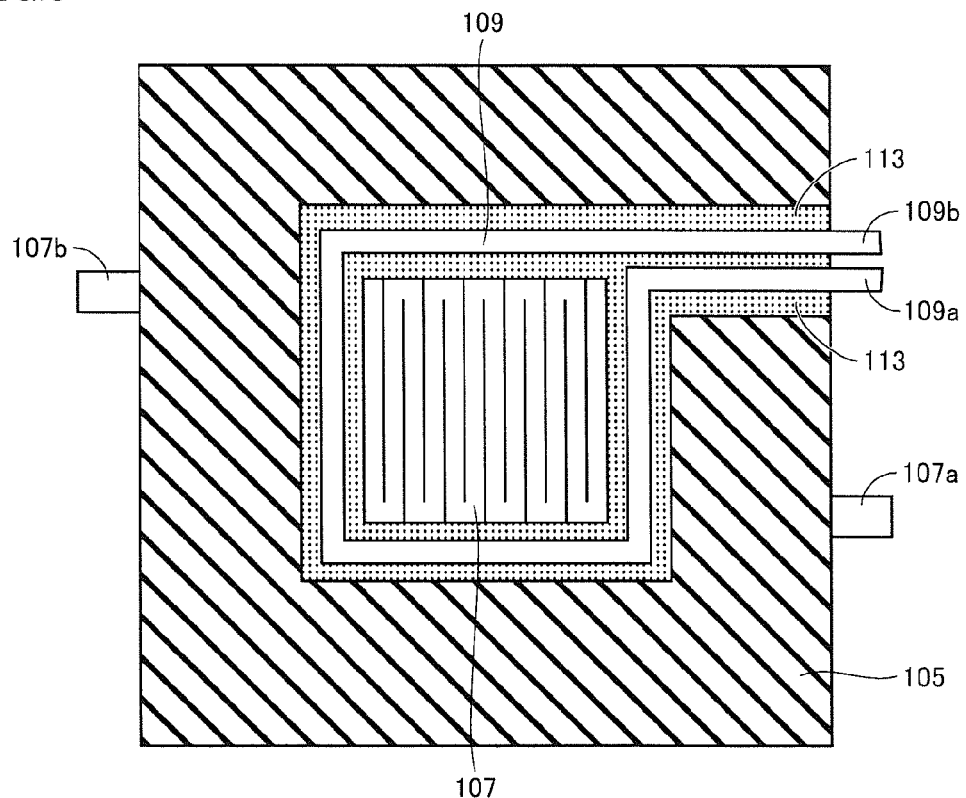
FIG. 3 is a schematic top view showing a state where first walls are arranged on a surface of the first separator shown in FIG. 2.

FIG. 1 is a schematic cross sectional view showing a preferable example of the alkaline fuel cell (X) in accordance with the present invention. FIG. 2 is a schematic top view showing a first separator constituting the alkaline fuel cell (X) shown in FIG. 1, and showing a surface of the first separator on a side facing the anion conductive electrolyte membrane. FIG. 3 shows a state where first walls are arranged on the surface of the first separator, in a schematic top view.

An alkaline fuel cell 100 shown in these drawings mainly includes: a membrane electrode assembly including an anion conductive electrolyte membrane 101, an anode electrode 103 stacked on a first surface 101a of anion conductive electrolyte membrane 101, and a cathode electrode 102 stacked on a second surface 101b opposite to first surface 101a of anion conductive electrolyte membrane 101; a first separator 105 stacked on anode electrode 103, at least including a fuel receiving portion 107 for receiving a fuel; a second separator 104 stacked on cathode electrode 102, at least including an oxidant receiving portion 106 for receiving an oxidant; and first and second alkaline aqueous solution supply portions 120, 121 for bringing an alkaline aqueous solution into contact with only anion conductive electrolyte membrane 101 of the membrane electrode assembly. In the present embodiment, first and second alkaline aqueous solution supply portions 120, 121 are configured to introduce the alkaline aqueous solution from one end (for example, from an alkaline aqueous solution introducing pipe 109a in first alkaline aqueous solution supply portion 120) and emit the alkaline aqueous solution from the other end (for example, from an alkaline aqueous solution emitting pipe 109b in first alkaline aqueous solution supply portion 120).

In alkaline fuel cell 100, anode electrode 103 and cathode electrode 102 each have an area smaller than those of anion conductive electrolyte membrane 101, first separator 105, and second separator 104. Therefore, in a region beside each electrode and between anion conductive electrolyte membrane 101 and each separator, there is a gap (space) in which each electrode does not exist. Anode electrode 103 and cathode electrode 102 are stacked at substantially central portions of surfaces of anion conductive electrolyte membrane 101 such that their positions in the surfaces of anion conductive electrolyte membrane 101 match each other.

First alkaline aqueous solution supply portion 120 includes a first concave portion 109 provided in a surface of first separator 105 on a side facing anion conductive electrolyte membrane 101 in the region in which anode electrode 103 does not exist, and a first space 111 located immediately above first concave portion 109 and continuing to first concave portion 109. First concave portion 109 is formed to be independent from fuel receiving portion 107 and surround fuel receiving portion 107 (see FIG. 2). First space 111 is a space interposed between first concave portion 109 and anion conductive electrolyte membrane 101 and is a portion of the above gap (space) in which the electrode does not exist, but is isolated from the other portion of the gap (space) in which the electrode does not exist by first walls 113 provided at peripheral edges of first space 111. First space 111 is a space sandwiched between two first walls 113 arranged to be spaced from each other. First walls 113 extend from the surface of first separator 105 on the side facing anion conductive electrolyte membrane 101 to first surface 101a of anion conductive electrolyte membrane 101, and thereby leakage of the alkaline aqueous solution out of first space 111 is prevented, and first alkaline aqueous solution supply portion 120 is spatially separated from anode electrode 103. Thus, first space 111 is an internal space formed by first separator 105, anion conductive electrolyte membrane 101, and two first walls 113.

With first alkaline aqueous solution supply portion 120 configured as described above, the alkaline aqueous solution passing through first alkaline aqueous solution supply portion 120 comes into contact with only first surface 101a of anion conductive electrolyte membrane 101. Alkaline aqueous solution introducing pipe 109a and alkaline aqueous solution emitting pipe 109b may be connected to an inlet-side end portion and an outlet-side end portion, respectively, of first concave portion 109 constituting first alkaline aqueous solution supply portion 120 (the same applies to a second concave portion 108 constituting second alkaline aqueous solution supply portion 121 described later).

Similarly, second alkaline aqueous solution supply portion 121 includes second concave portion 108 provided in a surface of second separator 104 on a side facing anion conductive electrolyte membrane 101 in the region in which cathode electrode 102 does not exist, and a second space 110 located immediately below second concave portion 108 and continuing to second concave portion 108. Second concave portion 108 is formed to be independent from oxidant receiving portion 106 and surround oxidant receiving portion 106. Second space 110 is a space interposed between second concave portion 108 and anion conductive electrolyte membrane 101 and is a portion of the above gap (space) in which the electrode does not exist, but is isolated from the other portion of the gap (space) in which the electrode does not exist by second walls 112 provided at peripheral edges of second space 110. Second space 110 is a space sandwiched between two second walls 112 arranged to be spaced from each other. Second walls 112 extend from the surface of second separator 104 on the side facing anion conductive electrolyte membrane 101 to second surface 101b of anion conductive electrolyte membrane 101, and thereby leakage of the alkaline aqueous solution out of second space 110 is prevented, and second alkaline aqueous solution supply portion 121 is spatially separated from cathode electrode 102. Thus, second space 110 is an internal space formed by second separator 104, anion conductive electrolyte membrane 101, and two second walls 112.

With second alkaline aqueous solution supply portion 121 configured as described above, the alkaline aqueous solution passing through second alkaline aqueous solution supply portion 121 comes into contact with only second surface 101b of anion conductive electrolyte membrane 101.

First walls 113 and second walls 112 are formed to extend along both end portions in a width direction of first concave portion 109 and second concave portion 108, respectively (see FIG. 3).

Fuel receiving portion 107 can be made of a third concave portion independent from first concave portion 109 constituting first alkaline aqueous solution supply portion 120, provided in the surface of first separator 105 on the side facing anion conductive electrolyte membrane 101 in a region in which anode electrode 103 is stacked. The third concave portion can be a flow channel groove having, for example, a serpentine shape as shown in FIG. 2, or another shape. In addition, the third concave portion can be a tank-shaped concave portion formed to expand over a relatively wide area, or the like. The fuel introduced into fuel receiving portion 107 is supplied to anode electrode 103 arranged immediately thereabove. A fuel supplying pipe 107a and a fuel emitting pipe 107b may be connected to an inlet-side end portion and an outlet-side end portion, respectively, of the third concave portion constituting fuel receiving portion 107.

Oxidant receiving portion 106 can be made of a fourth concave portion independent from second concave portion 108 constituting second alkaline aqueous solution supply portion 121, provided in the surface of second separator 104 on the side facing anion conductive electrolyte membrane 101 in a region in which cathode electrode 102 is stacked. As with the third concave portion, the fourth concave portion can be a flow channel groove having, for example, a serpentine shape or another shape. In addition, the fourth concave portion can be a tank-shaped concave portion formed to expand over a relatively wide area. The oxidant introduced into oxidant receiving portion 106 is supplied to cathode electrode 102 arranged immediately therebelow. An oxidant supplying pipe and an oxidant emitting pipe may be connected to an inlet-side end portion and an outlet-side end portion, respectively, of the fourth concave portion constituting oxidant receiving portion 106.

Although alkaline fuel cell 100 in accordance with the present embodiment has both first alkaline aqueous solution supply portion 120 for bringing the alkaline aqueous solution into contact with the surface of anion conductive electrolyte membrane 101 on the side facing anode electrode 103 (first surface 101a) and second alkaline aqueous solution supply portion 121 for bringing the alkaline aqueous solution into contact with the surface of anion conductive electrolyte membrane 101 on the side facing cathode electrode 102 (second surface 101b), alkaline fuel cell 100 may be configured to have only either one of them. In this case, the configuration including first alkaline aqueous solution supply portion 120 which brings the alkaline aqueous solution into contact with the surface of anion conductive electrolyte membrane 101 on the side facing anode electrode 103 where accumulation of $CO_2$-derived anions may occur is preferable, because it can promote neutralization in anion conductive electrolyte membrane 101 more efficiently.

Next, members and the like constituting the alkaline fuel cell (X) in accordance with the present invention will be described in more detail.

(Anion Conductive Electrolyte Membrane)

Anion conductive electrolyte membrane 101 is not particularly limited as long as it can conduct OH⁻ ions and has electrical insulation properties to prevent a short circuit between anode electrode 103 and cathode electrode 102, and an anion conductive solid polymer electrolyte membrane can be suitably used. Preferable examples of the anion conductive solid polymer electrolyte membrane include perfluoro sulfonic acid-based, perfluoro carboxylic acid-based, styrene vinylbenzene-based, and quaternary ammonium-based solid polymer electrolyte membranes (anion exchange membranes). Further, an anion conductive solid oxide electrolyte membrane can also be used as anion conductive electrolyte membrane 101.

Anion conductive electrolyte membrane 101 preferably has an anion conductivity of not less than $10^{-5}$ S/cm, and it is more preferable to use an electrolyte membrane having an anion conductivity of not less than $10^{-3}$ S/cm, such as a perfluoro sulfonic acid-based polymer electrolyte membrane. The thickness of anion conductive electrolyte membrane 101 is generally 5 to 300 μm, and preferably 10 to 200 μm.

(Anode Electrode and Cathode Electrode)

Anode electrode 103 stacked on first surface 101a of anion conductive electrolyte membrane 101 and cathode electrode 102 stacked on second surface 101b opposite to first surface 101a each include at least a catalyst layer made of a porous layer containing a catalyst and an electrolyte. These catalyst layers are stacked in contact with the surfaces of anion conductive electrolyte membrane 101. The catalyst of anode electrode 103 (anode catalyst) catalyzes a reaction of generating water and electrons from the fuel supplied to anode electrode 103 and the OH⁻ anions. The electrolyte contained in the catalyst layer of anode electrode 103 (anode catalyst layer) has a function of conducting the OH⁻ anions conducted from anion conductive electrolyte membrane 101 to a catalytic reaction site. On the other hand, the catalyst of cathode electrode 102 (cathode catalyst) catalyzes a reaction of generating OH⁻ anions from the oxidant and water supplied to cathode electrode 102 and electrons transferred from anode electrode 103. The electrolyte contained in the catalyst layer of cathode electrode 102 (cathode catalyst layer) has a function of conducting the generated OH⁻ anions to anion conductive electrolyte membrane 101.

As each of the anode catalyst and the cathode catalyst, a conventionally known catalyst can be used, and examples thereof include fine particles of platinum, iron, cobalt, nickel, palladium, silver, ruthenium, iridium, molybdenum, manganese, a metal compound thereof, and an alloy containing two or more types of these metals. The alloy is preferably an alloy containing at least two or more types of platinum, iron, cobalt, and nickel, and examples thereof include a platinum-iron alloy, a platinum-cobalt alloy, an iron-cobalt alloy, a cobalt-nickel alloy, an iron-nickel alloy, an iron-cobalt-nickel alloy, and the like. The anode catalyst and the cathode catalyst may be of the same type or of different types.

Preferably, as each of the anode catalyst and the cathode catalyst, a catalyst supported on a support, preferably a catalyst supported on an electrically conductive support, is used. Examples of the electrically conductive support include electrically conductive carbon particles of carbon black such as acetylene black, furnace black, channel black, and ketjen black, graphite, activated carbon, and the like. Further, carbon fiber such as vapor-grown carbon fiber (VGCF), carbon nanotube, and carbon nanowire can also be used.

As the electrolytes contained in the catalyst layers of anode electrode 103 and cathode electrode 102, the same one as the electrolyte constituting the anion conductive solid polymer electrolyte membrane can be used. The content ratio by weight between the catalyst and the electrolyte in each catalyst layer is generally about 5/1 to 1/4, and preferably about 3/1 to 1/3.

Anode electrode 103 and cathode electrode 102 may each include a gas diffusion layer stacked on the catalyst layer. The gas diffusion layer has a function of diffusing the supplied fuel or oxidant in a plane, and also has a function of supplying and receiving electrons to and from the catalyst layer.

The gas diffusion layer can be a porous layer having electrical conductivity, and specifically can be, for example, carbon paper; carbon cloth; an epoxy resin film containing carbon particles; a foam or sintered body of a metal or an alloy; fiber nonwoven cloth; or the like. The thickness of the gas diffusion layer is preferably not less than 10 μm to decrease the diffusion resistance of the fuel or the oxidant in a direction perpendicular to a thickness direction (in-plane direction), and preferably not more than 1 mm to decrease the diffusion resistance in the thickness direction. More preferably, the thickness of the gas diffusion layer is 100 to 500 μm.

As shown in FIG. 1, anode electrode 103 and cathode electrode 102 are generally provided to face each other with anion conductive electrolyte membrane 101 interposed therebetween. Generally in the alkaline fuel cell (X) in accordance with the present invention, anode electrode 103 and cathode electrode 102 are each formed to have an area smaller than those of anion conductive electrolyte membrane 101, first separator 105, and second separator 104. This enables construction of first space 111 and second space 110 each serving as a portion of the alkaline aqueous solution supply portion, by arranging first walls 113 and second walls 112 at the gaps in which the electrodes do not exist interposed between the separators and anion conductive electrolyte membrane 101. Anode electrode 103 and cathode electrode 102 are formed at, for example, the central portion of anion conductive electrolyte membrane 101.

(First Separator and Second Separator)

First separator 105 can be a member at least having the third concave portion constituting fuel receiving portion 107 and first concave portion 109 as a portion of first alkaline aqueous solution supply portion 120, in its surface facing anion conductive electrolyte membrane 101. Second separator 104 can be a member at least having the fourth concave portion constituting oxidant receiving portion 106 and second concave portion 108 as a portion of second alkaline aqueous solution supply portion 121, in its surface facing anion conductive electrolyte membrane 101.

The third concave portion constituting fuel receiving portion 107 and the fourth concave portion constituting oxidant receiving portion 106 are formed in the regions in which anode electrode 103 and cathode electrode 102 are stacked, respectively, as described above. On the other hand, although first concave portion 109 is one flow channel groove having an inlet and an outlet formed to surround fuel receiving portion 107 (third concave portion) in the example shown in FIG. 2, first concave portion 109 is not limited thereto as long as it is independent from the third concave portion constituting fuel receiving portion 107, and it only needs to be formed in at least a portion of the periphery of fuel receiving portion 107. For example, first concave portion 109 is not necessarily required to be formed to extend along all four sides of fuel receiving portion 107, and may be formed to extend along one or more sides thereof. However, in order to perform neutralization in anion conductive electrolyte membrane 101 more efficiently, first concave portion 109 is preferably formed to surround fuel receiving portion 107 (third concave portion).

Further, in order to perform neutralization in anion conductive electrolyte membrane 101 more efficiently, first concave portion 109 can be, for example, a tank-shaped concave portion (which can have an inlet and an outlet, or may not have an outlet) formed to expand over a relatively wide area, or can be made of a plurality of flow channel grooves or a branched flow channel groove, to allow the alkaline aqueous solution to be supplied over a wider range in the surface of anion conductive electrolyte membrane 101. The same applies to second concave portion 108 in second separator 104.

Figure 4:
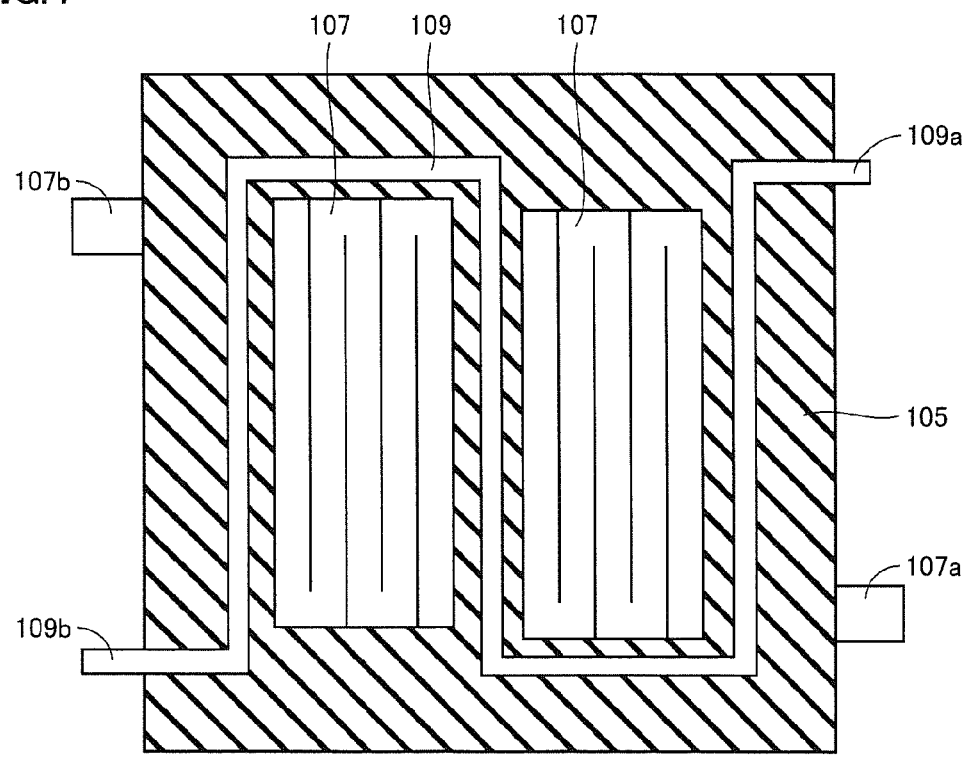
FIG. 4 is a schematic top view showing another example of the first separator of the alkaline fuel cell (X) in accordance with the present invention.

Further, in order to be able to efficiently perform neutralization in a region in anion conductive electrolyte membrane 101 in which anode electrode 103 is stacked (i.e., a region corresponding to a region in first separator 105 in which fuel receiving portion 107 is formed), first concave portion 109 is preferably arranged to be as close to the central portion of the region as possible (the same applies to second concave portion 108). For example, if anode electrode 103 has a rectangular shape, and accordingly fuel receiving portion 107 also has a rectangular shape, it is preferable to form first concave portion 109 to extend along a long side rather than a short side, or extend along a long side rather than a short side as much as possible. In addition, if it is not possible to arrange first concave portion 109 to be close to the central portion of the region in anion conductive electrolyte membrane 101 in which anode electrode 103 is stacked merely by forming first concave portion 109 to surround fuel receiving portion 107, in such a case where anode electrode 103 has a large area, it is preferable to arrange first concave portion 109 at a position close to the above central portion by adopting such a configuration of dividing anode electrode 103 into a plurality, accordingly dividing fuel receiving portion 107 into a plurality, and arranging first concave portion 109 between divided fuel receiving portions 107 (see FIG. 4). Also in the example shown in FIG. 4, first concave portion 109 is foamed to extend preferentially along a long side as described above.

As each of first separator 105 and second separator 104, a so-called bipolar plate including both fuel receiving portion 107 and oxidant receiving portion 106 can also be used. In this case, the bipolar plate has the third concave portion and the first concave portion in one surface (the first surface), and has the fourth concave portion and the second concave portion in the other surface (the second surface) opposite to the first surface. When the bipolar plate is used as first separator 105, it is stacked on anode electrode 103 such that its first surface faces anion conductive electrolyte membrane 101. When the bipolar plate is used as second separator 104, it is stacked on cathode electrode 102 such that its second surface faces anion conductive electrolyte membrane 101.

Using the bipolar plate is advantageous, for example, for providing a thinner stack structure when the stack structure is constructed by stacking a plurality of single cells.

Although the material for first separator 105 and second separator 104 is not particularly limited, it is preferably an electrically-conductive material such as a carbon material, an electrically-conductive polymer, various metals, and an alloy represented by stainless steel. By using the electrically-conductive material, these separators can be provided with a current collecting function, that is, a function as an extraction electrode supplying and receiving electrons to and from an electrode in contact therewith and performing electrical wiring. However, first separator 105 and second separator 104 may each be made of an electrically non-conductive material such as a plastic material, and an anode current collecting layer and a cathode current collecting layer may be provided additionally. In this case, these current collecting layers are arranged, for example, between the respective electrodes and separators.

As described above, in alkaline fuel cell 100 in accordance with the present embodiment, first alkaline aqueous solution supply portion 120 includes first concave portion 109 formed in the surface of first separator 105, and first space 111 continuing to first concave portion 109, sandwiched between first walls 113, and second alkaline aqueous solution supply portion 121 includes second concave portion 108 formed in the surface of second separator 104, and second space 110 continuing to second concave portion 108, sandwiched between second walls 112.

First walls 113 and second walls 112 are walls isolating first space 111 and second space 110 each serving as a portion of the alkaline aqueous solution supply portion, respectively, from the other portions of the gaps (spaces) in which the electrodes do not exist, and each extend in the thickness direction from the surface of each separator on the side facing anion conductive electrolyte membrane 101 to the surface of anion conductive electrolyte membrane 101. By first walls 113 and second walls 112, first alkaline aqueous solution supply portion 120 and second alkaline aqueous solution supply portion 121 are spatially separated from anode electrode 103 and cathode electrode 102, respectively.

First walls 113 and second walls 112 are formed to be substantially parallel to first concave portion 109 and second concave portion 108, respectively, to extend along both end portions in the width direction of the respective concave portions (see FIG. 3). First walls 113 and second walls 112 may be formed to cover all of the gaps (spaces) in which the electrodes do not exist, other than first space 111 and second space 110 each serving as a portion of the alkaline aqueous solution supply portion. In that case, when first separator 105 and second separator 104 of alkaline fuel cell 100 are fastened with a fastening member or the like, stress is equalized and stability is improved.

Fastening between first separator 105 and second separator 104 can be performed using a fastening member such as a screw, a bolt, and a nut.

Further, first walls 113 and second walls 112 may be arranged to be partially fit into grooves formed to be substantially parallel to first concave portion 109 and second concave portion 108, respectively, to extend along both end portions in the width direction of the respective concave portions. Such a configuration facilitates positioning of first walls 113 and second walls 112 during assembly of the alkaline fuel cell, and improves productivity. In addition, since the configuration can prevent misalignment of first walls 113 and second walls 112, it can provide a highly reliable alkaline fuel cell.

The material for first wall 113 and second wall 112 is not particularly limited as long as it is resistant to the alkaline aqueous solution and it is impermeable to the alkaline aqueous solution. Examples thereof can include: an elastic body such as butyl rubber, ethylene-propylene rubber, chloroprene rubber, nitrile rubber, silicone rubber, tetrafluoroethylene-propylene rubber, and tetrafluoroethylene-perfluoromethylvinylidene-based rubber; a non-elastic body such as a thermoplastic resin represented by tetrafluoroethylene, polypropylene, and polymethylpentene, and a metal or an alloy represented by stainless steel; and the like.

Alkaline aqueous solution supply portion 120, 121 is not limited to a configuration including a concave portion formed in the surface of each separator and a space continuing thereto, as long as it is configured to bring the passing alkaline aqueous solution into contact with only anion conductive electrolyte membrane 101 of the membrane electrode assembly. For example, as for first alkaline aqueous solution supply portion 120, referring to FIG. 1, a configuration of using a first separator in which a portion in first separator 105 in which first concave portion 109 is formed protrudes more than a portion thereof in which fuel receiving portion 107 is formed to the extent that it comes into contact with first surface 101a of anion conductive electrolyte membrane 101, and omitting first walls 113 may be adopted. In this case, first alkaline aqueous solution supply portion 120 includes only first concave portion 109. The same applies to second alkaline aqueous solution supply portion 121.

The alkaline aqueous solution passing through alkaline aqueous solution supply portions 120, 121 is not particularly limited, and for example, an aqueous solution containing: an alkali metal hydroxide such as sodium hydroxide (NaOH) and potassium hydroxide (KOH); an alkali earth metal hydroxide such as calcium hydroxide ($Ca(OH)_2$) and barium hydroxide ($Ba(OH)_2$); a basic organic compound represented by an amine compound such as 2-ethanolamine, or the like can be used.

(Fuel and Oxidant)

As the fuel supplied to anode electrode 103 of the alkaline fuel cell (X) in accordance with the present invention, for example, $H_2$ gas, hydrocarbon gas, alcohol such as methanol, ammonia gas, or the like can be used. In particular, $H_2$ gas is preferably used. As the oxidant supplied to cathode electrode 102, for example, $O_2$ gas, gas containing $O_2$ such as air, or the like can be used. In particular, air is preferably used.

Since the oxidant reacts with water at cathode electrode 102, humidified $O_2$ gas or air may be supplied to supply water to cathode electrode 102.

It is noted that, if a hydrocarbon compound such as hydrocarbon gas or alcohol (such as methanol) is used as the fuel, carbon dioxide is generated as a reaction product at the anode electrode. Therefore, in a conventional alkaline fuel cell, carbonation of the anion conductive electrolyte membrane and the anode electrode (accumulation of $CO_2$-derived anions) significantly proceeds. However, with the alkaline fuel cell (X) in accordance with the present invention, even if such a fuel is used, accumulation of $CO_2$-derived anions into the anode electrode can be effectively suppressed.

The alkaline fuel cell (X) in accordance with the present invention is suitably applicable, for example, as a power source for a vehicle, a household cogeneration system, a mobile electronic device, and the like (the same applies to an alkaline fuel cell (Y) described below).

<Alkaline Fuel Cell (Y)>

An alkaline fuel cell (Y) in accordance with the present invention includes: a membrane electrode assembly including an anode electrode, an anion conductive electrolyte membrane, and a cathode electrode; a first separator stacked on the anode electrode, at least including a fuel receiving portion for receiving a fuel; and a second separator stacked on the cathode electrode, at least including an oxidant receiving portion for receiving an oxidant, and further includes a liquid water supply flow channel supplying liquid water (water in the form of a liquid) to the anion conductive electrolyte membrane, provided on an anode electrode side and/or a cathode electrode side.

The liquid water supply flow channel directly supplies the liquid water to the anion conductive electrolyte membrane while preventing direct supply of the liquid water to the electrodes (the anode electrode and the cathode electrode) (i.e., supply of the liquid water to the electrodes from interfaces between the anion conductive electrolyte membrane and the electrodes, as described for example in Patent Literature 2). The liquid water supply flow channel is configured to include a space which is sandwiched between elastic walls arranged between the first separator or the second separator and the anion conductive electrolyte membrane, is isolated from the electrode by the elastic walls, and is in contact with only the anion conductive electrolyte membrane of the membrane electrode assembly.

Hereinafter, the alkaline fuel cell (Y) in accordance with the present invention will be described in detail with reference to an embodiment.

Figure 5:
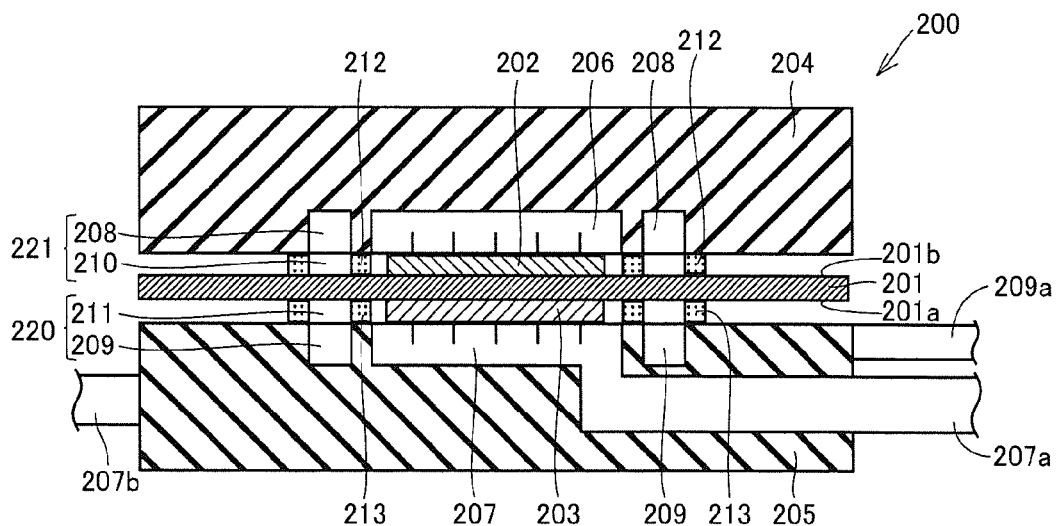
FIG. 5 is a schematic cross sectional view showing a preferable example of an alkaline fuel cell (Y) in accordance with the present invention.
Figure 6:
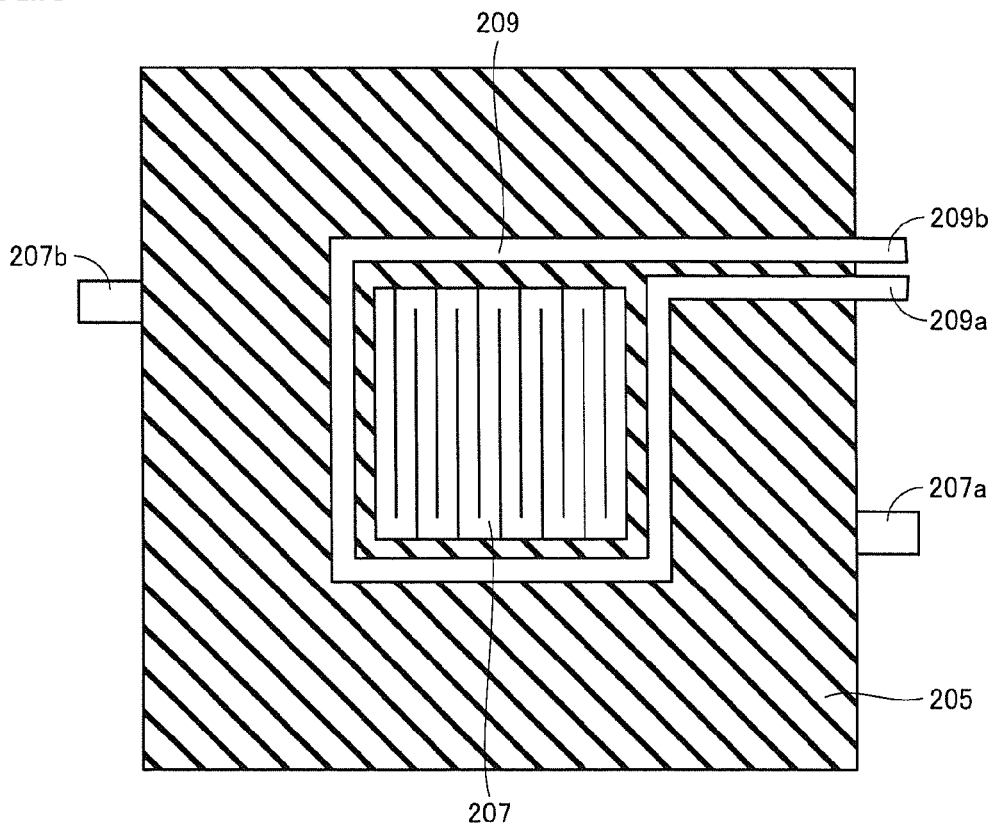
FIG. 6 is a schematic top view showing a first separator constituting the alkaline fuel cell (Y) shown in FIG. 5.
Figure 7:
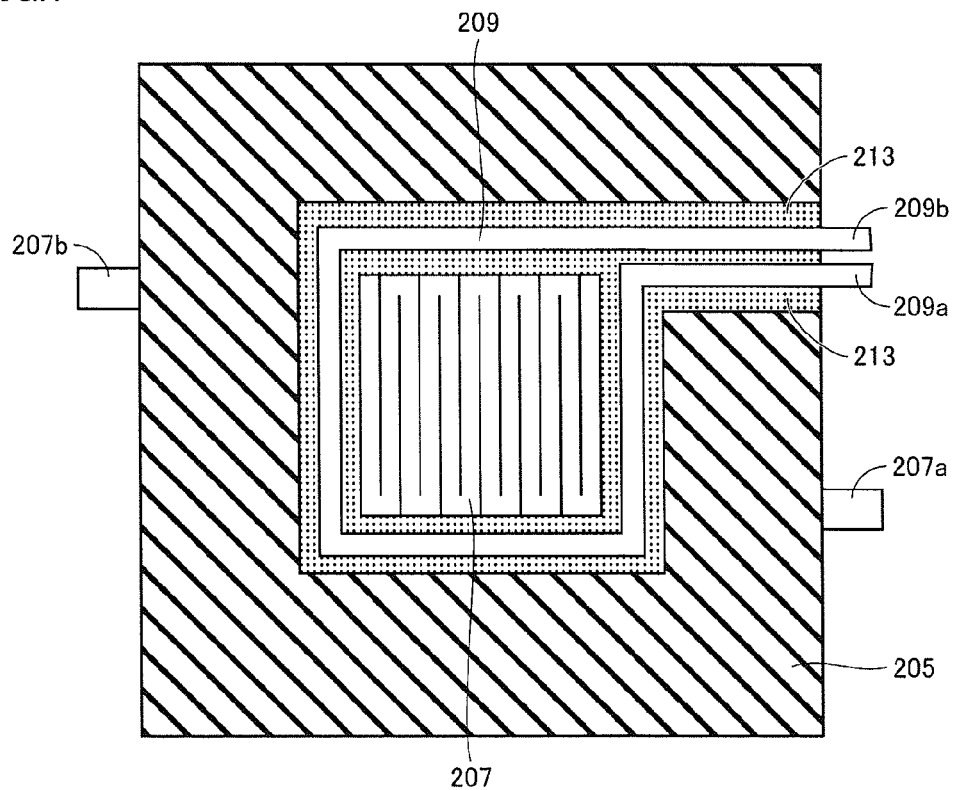
FIG. 7 is a schematic top view showing a state where first elastic walls are arranged on a surface of the first separator shown in FIG. 6.

FIG. 5 is a schematic cross sectional view showing a preferable example of the alkaline fuel cell (Y) in accordance with the present invention. FIG. 6 is a schematic top view showing a first separator constituting the alkaline fuel cell (Y) shown in FIG. 5, and showing a surface of the first separator on a side facing the anion conductive electrolyte membrane. FIG. 7 shows a state where first elastic walls are arranged on the surface of the first separator, in a schematic top view.

An alkaline fuel cell 200 shown in these drawings mainly includes: a membrane electrode assembly including an anion conductive electrolyte membrane 201, an anode electrode 203 stacked on a first surface 201a of anion conductive electrolyte membrane 201, and a cathode electrode 202 stacked on a second surface 201b opposite to first surface 201a of anion conductive electrolyte membrane 201; a first separator 205 stacked on anode electrode 203, at least including a fuel receiving portion 207 for receiving a fuel; a second separator 204 stacked on cathode electrode 202, at least including an oxidant receiving portion 206 for receiving an oxidant; and first and second liquid water supply flow channels 220, 221 for supplying liquid water to anion conductive electrolyte membrane 201. First and second liquid water supply flow channels 220, 221 are configured to introduce the liquid water from one end (for example, from a liquid water introducing pipe 209a in first liquid water supply flow channel 220) and emit the liquid water from the other end (for example, from a liquid water emitting pipe 209b in first liquid water supply flow channel 220).

In alkaline fuel cell 200, anode electrode 203 and cathode electrode 202 each have an area smaller than those of anion conductive electrolyte membrane 201, first separator 205, and second separator 204. Therefore, in a region beside each electrode and between anion conductive electrolyte membrane 201 and each separator, there is a gap (space) in which each electrode does not exist. Anode electrode 203 and cathode electrode 202 are stacked at substantially central portions of surfaces of anion conductive electrolyte membrane 201 such that their positions in the surfaces of anion conductive electrolyte membrane 201 match each other.

First liquid water supply flow channel 220 is configured to include a first space 211 which is a portion of the above gap (space) in which the electrode does not exist interposed between first separator 205 and anion conductive electrolyte membrane 201, and which is sandwiched between two first elastic walls 213 arranged to be spaced from each other. More specifically, first liquid water supply flow channel 220 includes first space 211, and a first concave portion 209 located immediately below first space 211 and continuing to first space 211. First elastic walls 213 are formed to extend along both end portions in a width direction of first concave portion 209 (see FIG. 7), and extend in a thickness direction from a surface of first separator 205 on a side facing anion conductive electrolyte membrane 201 to first surface 201a of anion conductive electrolyte membrane 201. That is, first space 211 is an internal space formed by first separator 205, anion conductive electrolyte membrane 201, and two first elastic walls 213.

First space 211 is isolated (spatially separated) from the other portion of the gap (space) in which the electrode does not exist, anode electrode 203, and fuel receiving portion 207, by first elastic walls 213 provided at peripheral edges thereof, and is in contact with only first surface 201a of anion conductive electrolyte membrane 201 of the membrane electrode assembly. First concave portion 209 is formed to be independent from fuel receiving portion 207 and surround fuel receiving portion 207 (see FIG. 6).

Similarly, second liquid water supply flow channel 221 is configured to include a second space 210 which is a portion of the above gap (space) in which the electrode does not exist interposed between second separator 204 and anion conductive electrolyte membrane 201, and which is sandwiched between two second elastic walls 212 arranged to be spaced from each other. More specifically, second liquid water supply flow channel 221 includes second space 210, and a second concave portion 208 located immediately above second space 210 and continuing to second space 210. Second elastic walls 212 are formed to extend along both end portions in a width direction of second concave portion 208, and extend in the thickness direction from a surface of second separator 204 on a side facing anion conductive electrolyte membrane 201 to second surface 201b of anion conductive electrolyte membrane 201. That is, second space 210 is an internal space formed by second separator 204, anion conductive electrolyte membrane 201, and two second elastic walls 212.

Second space 210 is isolated (spatially separated) from the other portion of the gap (space) in which the electrode does not exist, cathode electrode 202, and oxidant receiving portion 206, by second elastic walls 212 provided at peripheral edges thereof, and is in contact with only second surface 201b of anion conductive electrolyte membrane 201 of the membrane electrode assembly. Second concave portion 208 is formed to be independent from oxidant receiving portion 206 and surround oxidant receiving portion 206.

With first or second liquid water supply flow channel 220, 221 configured as described above, since the elastic walls are used as isolation walls interposed between each separator and anion conductive electrolyte membrane 201 and forming a portion of a liquid water flow channel space, good surface contact can be achieved between the elastic walls and each separator as well as anion conductive electrolyte membrane 201 by utilizing deformation of the elastic walls caused by applying pressure in the thickness direction of the alkaline fuel cell, and thus sealing properties at these interfaces can be improved. In addition, since the liquid water passing through the flow channel is configured to come into contact with only anion conductive electrolyte membrane 201, the liquid water can be supplied to only anion conductive electrolyte membrane 201 while reliably preventing leakage of the liquid water to each electrode, to an interface between each electrode and anion conductive electrolyte membrane 201, and further to fuel receiving portion 207/oxidant receiving portion 206.

Therefore, with alkaline fuel cell 200 in accordance with the present embodiment, flooding resulting from direct supply of the liquid water to the electrodes, and resultant decrease in power generation efficiency and output stability can be prevented. On the other hand, since anion conductive electrolyte membrane 201 can be humidified by supplying the liquid water to the electrolyte membrane, power generation efficiency and starting performance (time required to obtain a desired output from the beginning of power generation) can be improved.

Further, moisture supplied to anion conductive electrolyte membrane 201 through first and second liquid water supply flow channels 220, 221 dissolves and diffuses into the membrane, and further diffuses into the electrolyte in cathode electrode 202 which is in communication with the membrane as a path for conducting OH⁻ anions. Thereby, the moisture can be supplied to cathode electrode 202 without becoming a water film, and used for the catalytic reaction at the electrode.

Furthermore, according to the present embodiment, since direct supply of the liquid water to the electrodes can be prevented, swelling of anion conductive electrolyte membrane 201 by the liquid water in a region facing the electrodes is suppressed. In addition, since anion conductive electrolyte membrane 201 at peripheral edge portions of the electrodes is pressed and fixed by the elastic walls, dimensional change of anion conductive electrolyte membrane 201 is suppressed and delamination of the electrodes from anion conductive electrolyte membrane 201 can be prevented. Thus, a highly reliable alkaline fuel cell can be provided.

Furthermore, according to the present embodiment, since anion conductive electrolyte membrane 201 can be directly humidified by the liquid water passing through first and second liquid water supply flow channels 220, 221, and moisture can be supplied to cathode electrode 202 through anion conductive electrolyte membrane 201, a humidifier for humidifying the fuel and/or the oxidant that has been conventionally required can be omitted, which is advantageous for downsizing a fuel cell system.

It is noted that, in a fuel cell using a cation exchange membrane as an electrolyte membrane, when liquid water containing a minute amount of impurities such as metal cations is directly brought into contact with the electrolyte membrane, the electrolyte membrane may be deteriorated. However, in an alkaline fuel cell using an anion conductive electrolyte membrane (anion exchange membrane) as in the present invention, even if such liquid water is brought into contact with the anion conductive electrolyte membrane, metal cations as impurities do not enter the electrolyte membrane by the nature of the anion conductive electrolyte membrane, and thus deterioration due to the metal cations does not occur. Therefore, the alkaline fuel cell (Y) in accordance with the present invention also has advantages that it does not require a mechanism for removing a minute amount of metal cations from the liquid water, that an inexpensive member such as a metal pipe can be used as a pipe for supplying the liquid water to the alkaline fuel cell, and the like.

Although alkaline fuel cell 200 in accordance with the present embodiment has both first liquid water supply flow channel 220 on the anode side and second liquid water supply flow channel 221 on the cathode side, alkaline fuel cell 200 may be configured to have only either one of them. In this case, from the viewpoint of supplying moisture to cathode electrode 202, alkaline fuel cell 200 preferably has second liquid water supply flow channel 221 on the cathode side. However, even when alkaline fuel cell 200 has only first liquid water supply flow channel 220 on the anode side, it is possible to supply moisture to cathode electrode 202, because, due to an increase in moisture concentration in anode electrode 203, a moisture concentration gradient between anode electrode 203 and cathode electrode 202 is increased, and diffusion of moisture from anode electrode 203 to cathode electrode 202 is promoted.

Next, members and the like constituting the alkaline fuel cell (Y) in accordance with the present invention will be described in more detail.

Anion conductive electrolyte membrane 201, anode electrode 203, cathode electrode 202, and a gas diffusion layer stacked on a catalyst layer of each electrode as necessary can be configured identical to anion conductive electrolyte membrane 101, anode electrode 103, cathode electrode 102, and the gas diffusion layer constituting the alkaline fuel cell (X) described above, respectively, and the above description about the alkaline fuel cell (X) is also referred to for the alkaline fuel cell (Y).

As shown in FIG. 5, anode electrode 203 and cathode electrode 202 are generally provided to face each other with anion conductive electrolyte membrane 201 interposed therebetween. Generally in the alkaline fuel cell (Y) in accordance with the present invention, anode electrode 203 and cathode electrode 202 are each formed to have an area smaller than those of anion conductive electrolyte membrane 201, first separator 205, and second separator 204. This enables construction of first space 211 and second space 210 each serving as a portion of the liquid water supply flow channel, by arranging first elastic walls 213 and second elastic walls 212 at the gaps in which the electrodes do not exist interposed between the separators and anion conductive electrolyte membrane 201. Anode electrode 203 and cathode electrode 202 are formed at, for example, the central portion of anion conductive electrolyte membrane 201.

(First Separator and Second Separator)

First separator 205 can be a member at least having a third concave portion constituting fuel receiving portion 207 and first concave portion 209 as a portion of first liquid water supply flow channel 220, in its surface facing anion conductive electrolyte membrane 201. Second separator 204 can be a member at least having a fourth concave portion constituting oxidant receiving portion 206 and second concave portion 208 as a portion of second liquid water supply flow channel 221, in its surface facing anion conductive electrolyte membrane 201.

The third concave portion constituting fuel receiving portion 207 and the fourth concave portion constituting oxidant receiving portion 206 are concave portions independent from first concave portion 209 constituting first liquid water supply flow channel 220 and second concave portion 208 constituting second liquid water supply flow channel 221, provided in the surfaces of first separator 205 and second separator 204 on the sides facing anion conductive electrolyte membrane 201 in the regions in which anode electrode 203 and cathode electrode 202 are stacked, respectively.

The third concave portion and the fourth concave portion can each be a flow channel groove having, for example, a serpentine shape as shown in FIG. 6, or another shape. In addition, the third concave portion and the fourth concave portion can each be a tank-shaped concave portion formed to expand over a relatively wide area, or the like. The fuel introduced into fuel receiving portion 207 is supplied to anode electrode 203 arranged immediately thereabove, and the oxidant introduced into oxidant receiving portion 206 is supplied to cathode electrode 202 arranged immediately therebelow. A fuel supplying pipe 207a and a fuel emitting pipe 207b may be connected to an inlet-side end portion and an outlet-side end portion, respectively, of the third concave portion constituting fuel receiving portion 207. Similarly, an oxidant supplying pipe and an oxidant emitting pipe may be connected to an inlet-side end portion and an outlet-side end portion, respectively, of the fourth concave portion constituting oxidant receiving portion 206.

Although first concave portion 209 is one flow channel groove having an inlet and an outlet formed to surround fuel receiving portion 207 (third concave portion) in the example shown in FIG. 6, first concave portion 209 is not limited thereto as long as it is independent from the third concave portion constituting fuel receiving portion 207, and it only needs to be formed in at least a portion of the periphery of fuel receiving portion 207. For example, first concave portion 209 is not necessarily required to be formed to extend along all four sides of fuel receiving portion 207, and may be formed to extend along one or more sides thereof. However, in order to supply the liquid water to anion conductive electrolyte membrane 201 more efficiently, first concave portion 209 is preferably formed to surround fuel receiving portion 207 (third concave portion). Further, first concave portion 209 can be made of, for example, a plurality of flow channel grooves or a branched flow channel groove, to allow the liquid water to be supplied over a wider range in the surface of anion conductive electrolyte membrane 201. The same applies to second concave portion 208 in second separator 204.

Figure 8:
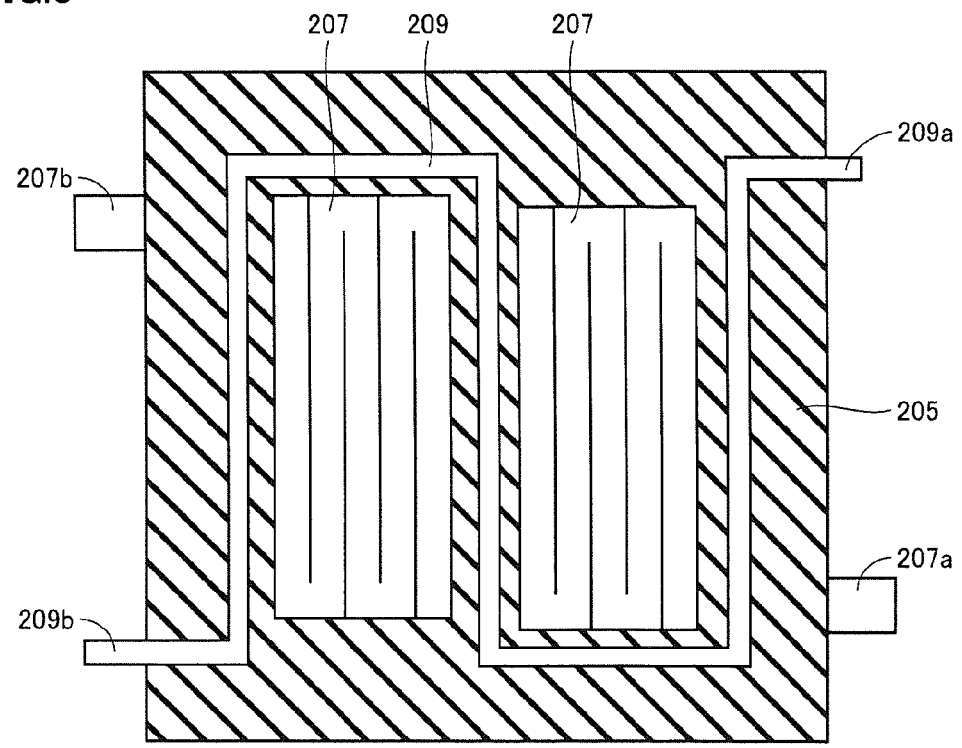
FIG. 8 is a schematic top view showing another example of the first separator of the alkaline fuel cell (Y) in accordance with the present invention.

Further, in order to be able to efficiently supply the liquid water to a region in anion conductive electrolyte membrane 201 in which anode electrode 203 is stacked (i.e., a region corresponding to a region in first separator 205 in which fuel receiving portion 207 is formed), first concave portion 209 is preferably arranged to be as close to the central portion of the region as possible (the same applies to second concave portion 208). For example, if anode electrode 203 has a rectangular shape, and accordingly fuel receiving portion 207 also has a rectangular shape, it is preferable to form first concave portion 209 to extend along a long side rather than a short side, or extend along a long side rather than a short side as much as possible. In addition, if it is not possible to arrange first concave portion 209 to be close to the central portion of the region in anion conductive electrolyte membrane 201 in which anode electrode 203 is stacked merely by forming first concave portion 209 to surround fuel receiving portion 207, in such a case where anode electrode 203 has a large area, it is preferable to arrange first concave portion 209 at a position close to the above central portion by adopting such a configuration of dividing anode electrode 203 into a plurality, accordingly dividing fuel receiving portion 207 into a plurality, and arranging first concave portion 209 between divided fuel receiving portions 207 (see FIG. 8). Also in the example shown in FIG. 8, first concave portion 209 is formed to extend preferentially along a long side as described above.

Liquid water introducing pipe 209a and liquid water emitting pipe 209b may be connected to an inlet-side end portion and an outlet-side end portion, respectively, of first concave portion 209 constituting first liquid water supply flow channel 220 (the same applies to second concave portion 208 constituting second liquid water supply flow channel 221).

As each of first separator 205 and second separator 204, a so-called bipolar plate including both fuel receiving portion 207 and oxidant receiving portion 206 can also be used. In this case, the bipolar plate has the third concave portion and the first concave portion in one surface (the first surface), and has the fourth concave portion and the second concave portion in the other surface (the second surface) opposite to the first surface. When the bipolar plate is used as first separator 205, it is stacked on anode electrode 203 such that its first surface faces anion conductive electrolyte membrane 201. When the bipolar plate is used as second separator 204, it is stacked on cathode electrode 202 such that its second surface faces anion conductive electrolyte membrane 201.

Using the bipolar plate is advantageous, for example, for providing a thinner stack structure when the stack structure is constructed by stacking a plurality of single cells.

The material for first separator 205 and second separator 204 is not particularly limited, and it can be identical to that for first separator 105 and second separator 104 constituting the alkaline fuel cell (X) described above. First separator 205 and second separator 204 may each be made of an electrically non-conductive material such as a plastic material, and an anode current collecting layer and a cathode current collecting layer may be provided additionally. In this case, these current collecting layers are arranged, for example, between the respective electrodes and separators.

As described above, in alkaline fuel cell 200 in accordance with the present embodiment, first liquid water supply flow channel 220 includes first concave portion 209 formed in the surface of first separator 205, and first space 211 continuing to first concave portion 209, sandwiched between first elastic walls 213, and second liquid water supply flow channel 221 includes second concave portion 208 formed in the surface of second separator 204, and second space 210 continuing to second concave portion 208, sandwiched between second elastic walls 212.

First elastic walls 213 and second elastic walls 212 are walls isolating first space 211 and second space 210 each serving as a portion of the liquid water supply flow channel, respectively, from the other portions of the gaps (spaces) in which the electrodes do not exist, the electrodes, and fuel receiving portion 207/oxidant receiving portion 206, and each extend in the thickness direction from the surface of each separator on the side facing anion conductive electrolyte membrane 201 to the surface of anion conductive electrolyte membrane 201.

First elastic walls 213 and second elastic walls 212 are formed to be substantially parallel to first concave portion 209 and second concave portion 208, respectively, to extend along both end portions in the width direction of the respective concave portions (see FIG. 7). First elastic walls 213 and second elastic walls 212 may be formed to cover all of the gaps (spaces) in which the electrodes do not exist, other than first space 211 and second space 210 each serving as a portion of the liquid water supply flow channel. In that case, when first separator 205 and second separator 204 of alkaline fuel cell 200 are fastened with a fastening member or the like, stress is equalized and stability is improved.

Further, first elastic walls 213 and second elastic walls 212 may be arranged to be partially fit into grooves formed to be substantially parallel to first concave portion 209 and second concave portion 208, respectively, to extend along both end portions in the width direction of the respective concave portions. Such a configuration facilitates positioning of the elastic walls during assembly of the alkaline fuel cell, and improves productivity. In addition, since the configuration can prevent misalignment of the elastic walls, it can provide a highly reliable alkaline fuel cell.

Fastening between first separator 205 and second separator 204 can be performed using a fastening member such as a screw, a bolt, and a nut. In alkaline fuel cell 200 in accordance with the present embodiment, even when a sufficient pressure is applied in the thickness direction of the alkaline fuel cell by fastening between first separator 205 and second separator 204 to obtain good sealing properties at the interfaces between the elastic walls and each separator as well as anion conductive electrolyte membrane 201 and an effect of sufficiently decreasing contact resistance between each electrode and each separator, use of the elastic walls which are appropriately crushed by the pressure and generate a repulsion force as isolation walls interposed between each separator and anion conductive electrolyte membrane 201 and forming a portion of a liquid water flow channel space can prevent an increase in material diffusion resistance due to excessive crushing of the electrodes and resultant blockage of pores.

The material for first elastic wall 213 and second elastic wall 212 is not particularly limited as long as it is impermeable to water. Examples thereof can include butyl rubber, ethylene-propylene rubber, chloroprene rubber, nitrile rubber, silicone rubber, tetrafluoroethylene-propylene rubber, tetrafluoroethylene-perfluoromethylvinylidene-based rubber, and the like.

First elastic wall 213 and second elastic wall 212 should be made of an elastic body such that they can be deformed by the pressure applied in the thickness direction of the alkaline fuel cell and thereby can improve sealing properties at the interfaces. When a large pressure is applied in the thickness direction of the alkaline fuel cell, it is necessary to thicken the separators or use a thick fastening member (bolt, nut) in order to prevent destruction by stress, which leads to an increase in size of the alkaline fuel cell. Therefore, from the viewpoint of obtaining the above sealing properties relatively easily and downsizing the alkaline fuel cell, first elastic wall 213 and second elastic wall 212 are preferably deformed with a relatively small pressure. Specifically, these elastic walls preferably have a Young's modulus of less than 100 MPa.

From the viewpoint of increasing a sealing area in order to reliably prevent leakage of the liquid water to fuel receiving portion 207 and oxidant receiving portion 206, first elastic wall 213 and second elastic wall 212 preferably have a width of not less than 1 mm. On the other hand, from the viewpoint of shortening a diffusion path from liquid water supply flow channel 220, 221 to cathode electrode 202 in order to increase moisture supply flux to cathode electrode 202, first elastic wall 213 and second elastic wall 212 preferably have a width of less than 5 mm.

The liquid water passing through liquid water supply flow channels 220, 221 is not limited to the one made of only water in the form of a liquid, and may be, for example, alkaline water. By passing alkaline water through first and/or second liquid water supply flow channel 220, 221 and supply it to anion conductive electrolyte membrane 201, $CO_2$-derived anions such as $CO_3^{2-}$ and $HCO_3^-$ existing in anion conductive electrolyte membrane 201, and $CO_2$-derived anions existing in anode electrode 203 and cathode electrode 202 adjacent thereto can be neutralized, and accumulation of the anions into anode electrode 203 can be effectively prevented. $CO_2$-derived anions are anions which gradually accumulate into anode electrode 203 in the alkaline fuel cell due to power generation, and cause an increase in reaction overvoltage at anode electrode 203 and a decrease in power generation efficiency.

When alkaline water is supplied through liquid water supply flow channels 220, 221, the alkaline water is supplied to only anion conductive electrolyte membrane 201 without coming into contact with the electrodes, and thus blockage of pores in the electrodes due to precipitation of salt generated by neutralization and resultant decrease in power generation efficiency can be prevented. Since counter cations of alkali do not enter anion conductive electrolyte membrane 201, precipitation of salt does not occur in anion conductive electrolyte membrane 201.

From the viewpoint of promoting neutralization in anion conductive electrolyte membrane 201 more efficiently, supply of the alkaline water is preferably performed using first liquid water supply flow channel 220 which can bring the alkaline water into contact with the surface of anion conductive electrolyte membrane 201 on the side facing anode electrode 203 into which $CO_2$-derived anions may accumulate.

One of preferable embodiments of the alkaline fuel cell (Y) in accordance with the present invention is to provide both first and second liquid water supply flow channels 220, 221 and pass different types of liquid water therethrough. As a more specific example, first liquid water supply flow channel 220 on the anode side is used as a supply channel for alkaline water, and second liquid water supply flow channel 221 on the cathode side is used as a supply channel for liquid water (made of only water in the form of a liquid). According to such an embodiment, neutralization of $CO_2$-derived anions can be promoted by supplying the alkaline water to anode electrode 203 into which $CO_2$-derived anions may accumulate, and at the same time moisture supply to cathode electrode 202 can be promoted by supplying the liquid water made of only water in the form of a liquid to cathode electrode 202 where water is required for an electrochemical reaction. Although different types of liquid water are passed in this embodiment, separators in the same shape can be used as first separator 205 and second separator 204, and thus the alkaline fuel cell can be manufactured through the same manufacturing process as that in the case where the same type of liquid water is passed.

Alkali added to the alkaline water is not particularly limited, and for example, an alkali metal hydroxide such as sodium hydroxide (NaOH) and potassium hydroxide (KOH); an alkali earth metal hydroxide such as calcium hydroxide ($Ca(OH)_2$) and barium hydroxide ($Ba(OH)_2$); a basic organic compound represented by an amine compound such as 2-ethanolamine, or the like can be used.

(Fuel and Oxidant)

The fuel and the oxidant used for the alkaline fuel cell (Y) in accordance with the present invention can be the same as those described for the above alkaline fuel cell (X). Since the oxidant reacts with water at cathode electrode 202, humidified $O_2$ gas or air may be supplied to supply water to cathode electrode 202.

It is noted that, if a hydrocarbon compound such as hydrocarbon gas or alcohol (such as methanol) is used as the fuel, carbon dioxide is generated as a reaction product at the anode electrode. Therefore, in a conventional alkaline fuel cell, carbonation of the anion conductive electrolyte membrane and the anode electrode (accumulation of $CO_2$-derived anions) significantly proceeds. However, with the alkaline fuel cell (Y) in accordance with the present invention, alkaline water can be supplied through liquid water supply flow channels 220, 221, and thus, even if such a fuel is used, accumulation of $CO_2$-derived anions into the anode electrode can be effectively suppressed.

<Alkaline Fuel Cell System>

Hereinafter, an alkaline fuel cell system in accordance with the present invention will be described in detail with reference to an embodiment.

(1) First Embodiment

Figure 9:
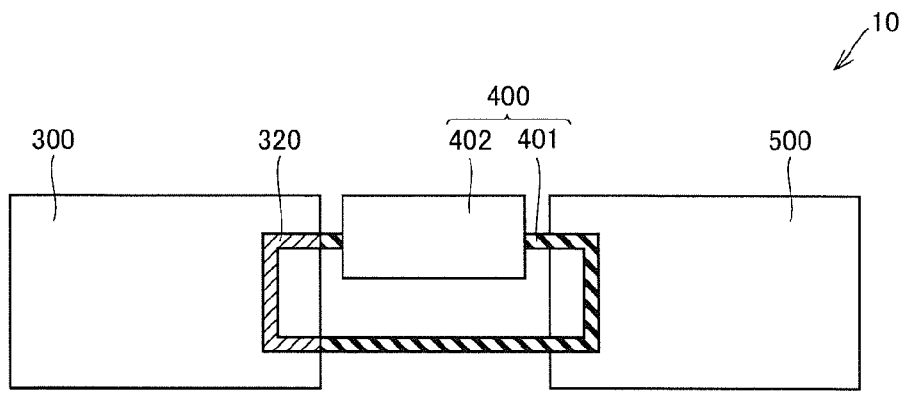
FIG. 9 is a schematic view showing an example of an alkaline fuel cell system in accordance with the present invention.

FIG. 9 is a schematic view showing a configuration of an alkaline fuel cell system 10 in accordance with the present embodiment. Alkaline fuel cell system 10 is a system which can adjust a temperature within an alkaline fuel cell 300 by a first heat medium, and includes alkaline fuel cell 300 including an inner-cell heat medium flow channel 320 passing the first heat medium; a first heat medium circulation portion 400 including an outer-cell heat medium flow channel 401 connected to inner-cell heat medium flow channel 320 and a first heat medium circulation apparatus 402, for circulating the first heat medium in a first heat medium flow channel including inner-cell heat medium flow channel 320 and outer-cell heat medium flow channel 401; and a first heat exchange portion 500 for performing heat exchange with the first heat medium within outer-cell heat medium flow channel 401.

Although a specific configuration that may be adopted by alkaline fuel cell 300 will be described later in detail, alkaline fuel cell 300 has one characteristic that it includes inner-cell heat medium flow channel 320 configured such that the first heat medium is brought into contact with and supplied to only an anion conductive electrolyte membrane of a membrane electrode assembly. With alkaline fuel cell system 10 including such an alkaline fuel cell 300, since the temperature of the anion conductive electrolyte membrane, which serves as a main member for performing power generation and is located in the immediate vicinity of heat generation sources (electrodes) during power generation, is directly adjusted by the first heat medium, heat exchange efficiency can be improved (therefore, time required until alkaline fuel cell 300 reaches a desired temperature can be shortened), and accuracy of temperature adjustment can be improved.

In addition, since the heat medium is not directly supplied to the electrodes of the membrane electrode assembly, occurrence of blockage of pores in the electrodes as represented by flooding, and resultant decrease in power generation efficiency and output stability of the fuel cell can be prevented, and there is no possibility that the electrodes are deteriorated by a minute amount of impurities in the heat medium.

[Alkaline Fuel Cell]

Figure 10:
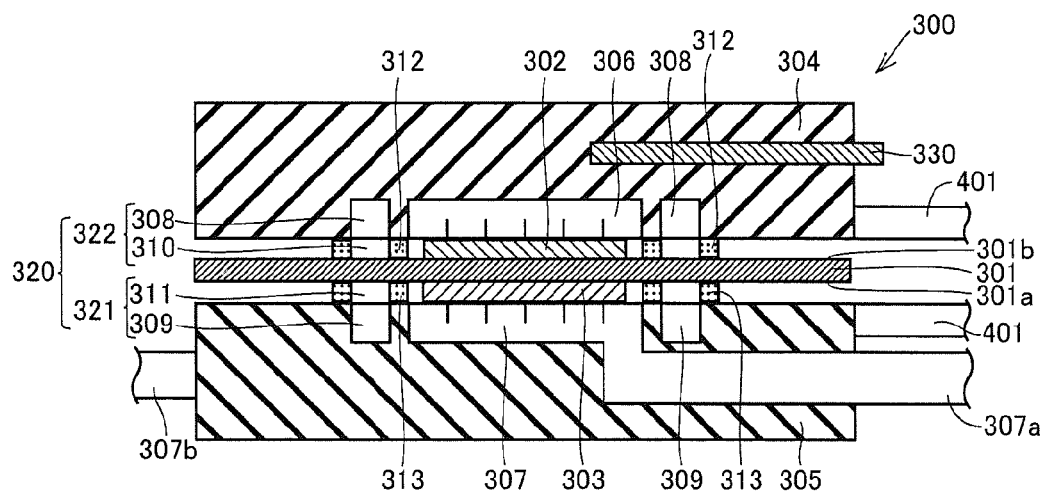
FIG. 10 is a schematic cross sectional view showing a preferable example of an alkaline fuel cell used in the alkaline fuel cell system in accordance with the present invention.
Figure 11:
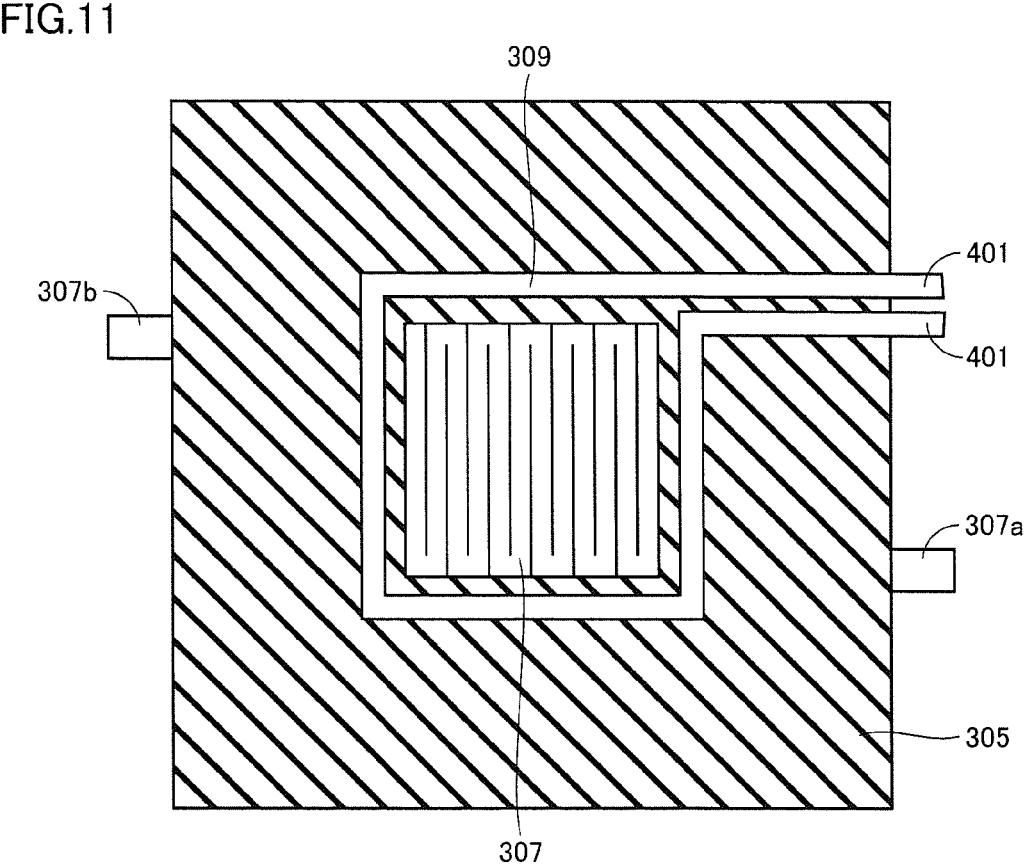
FIG. 11 is a schematic top view showing a first separator constituting the alkaline fuel cell shown in FIG. 10.
Figure 12:
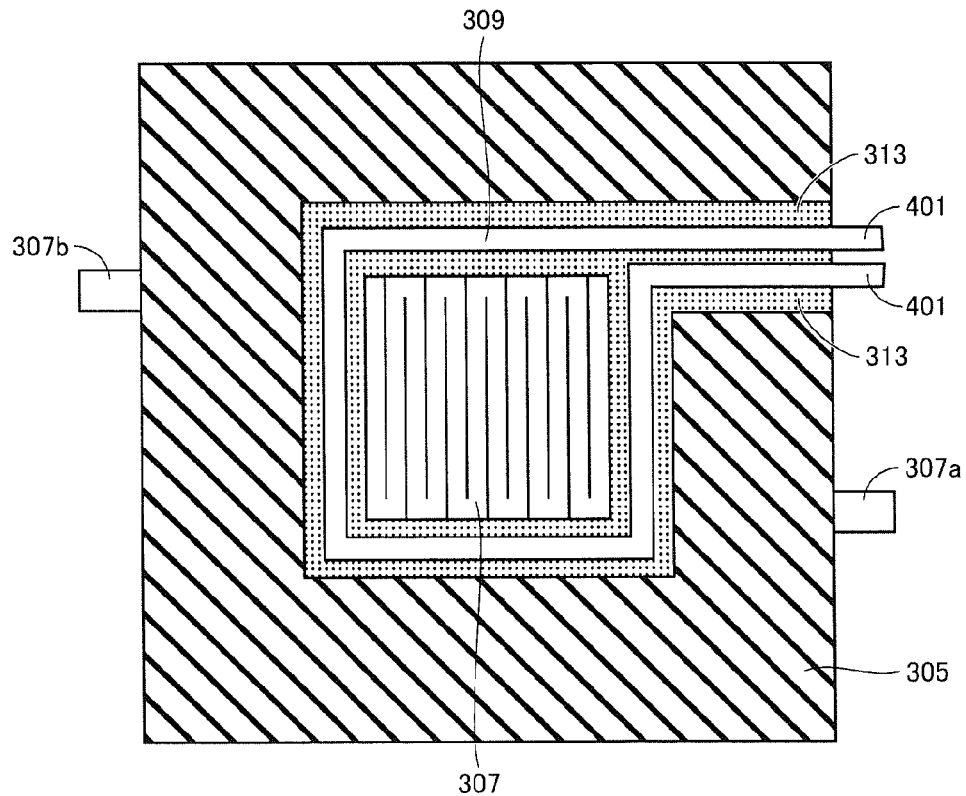
FIG. 12 is a schematic top view showing a state where first walls are arranged on a surface of the first separator shown in FIG. 11.

FIG. 10 is a schematic cross sectional view showing alkaline fuel cell 300 of alkaline fuel cell system 10 in accordance with the present embodiment as one example of an alkaline fuel cell that can be preferably used in the alkaline fuel cell system in accordance with the present invention. FIG. 11 is a schematic top view showing a first separator 305 constituting alkaline fuel cell 300 shown in FIG. 10, and showing a surface of first separator 305 on a side facing an anion conductive electrolyte membrane 301. FIG. 12 shows a state where first walls 313 are arranged on the surface of first separator 305, in a schematic top view.

Alkaline fuel cell 300 mainly includes: a membrane electrode assembly including anion conductive electrolyte membrane 301, an anode electrode 303 stacked on a first surface 301a of anion conductive electrolyte membrane 301, and a cathode electrode 302 stacked on a second surface 301b opposite to first surface 301a of anion conductive electrolyte membrane 301; first separator 305 stacked on anode electrode 303, at least including a fuel receiving portion 307 for receiving a fuel; a second separator 304 stacked on cathode electrode 302, at least including an oxidant receiving portion 306 for receiving an oxidant; and inner-cell heat medium flow channel 320 for bringing the first heat medium into contact with only anion conductive electrolyte membrane 301 of the membrane electrode assembly. A first temperature detection portion 330 will be described later.

Inner-cell heat medium flow channel 320 includes a first inner-cell heat medium flow channel 321 for bringing the first heat medium into contact with only a surface of anion conductive electrolyte membrane 301 on a side facing anode electrode 303 (first surface 301a), and a second inner-cell heat medium flow channel 322 for bringing the first heat medium into contact with only a surface of anion conductive electrolyte membrane 301 on a side facing cathode electrode 302 (second surface 301b). Both first inner-cell heat medium flow channel 321 and second inner-cell heat medium flow channel 322 are connected to outer-cell heat medium flow channel 401, and constitute the first heat medium flow channel as a circulation flow channel (see FIG. 9).

In alkaline fuel cell 300, anode electrode 303 and cathode electrode 302 each have an area smaller than those of anion conductive electrolyte membrane 301, first separator 305, and second separator 304. Therefore, in a region beside each electrode and between anion conductive electrolyte membrane 301 and each separator, there is a gap (space) in which each electrode does not exist. Anode electrode 303 and cathode electrode 302 are stacked at substantially central portions of surfaces of anion conductive electrolyte membrane 301 such that their positions in the surfaces of anion conductive electrolyte membrane 301 match each other.

First inner-cell heat medium flow channel 321 is configured to include a first space 311 which is a portion of the above gap (space) in which the electrode does not exist interposed between first separator 305 and anion conductive electrolyte membrane 301, and which is sandwiched between two first walls 313 arranged to be spaced from each other. More specifically, first inner-cell heat medium flow channel 321 includes first space 311, and a first concave portion 309 located immediately below first space 311 and continuing to first space 311. First walls 313 are formed to extend along both end portions in a width direction of first concave portion 309 (see FIG. 12), and extend in a thickness direction from the surface of first separator 305 on the side facing anion conductive electrolyte membrane 301 to first surface 301a of anion conductive electrolyte membrane 301. That is, first space 311 is an internal space formed by first separator 305, anion conductive electrolyte membrane 301, and two first walls 313. Thereby, leakage of the first heat medium out of first space 311 is prevented.

First space 311 is isolated (spatially separated) from the other portion of the gap (space) in which the electrode does not exist, anode electrode 303, and fuel receiving portion 307, by first walls 313 provided at peripheral edges thereof, and is in contact with only first surface 301a of anion conductive electrolyte membrane 301 of the membrane electrode assembly.

First concave portion 309 is a concave portion provided in the surface of first separator 305 on the side facing anion conductive electrolyte membrane 301 in the region in which anode electrode 303 does not exist, and is formed to be independent from fuel receiving portion 307 and surround fuel receiving portion 307 (see FIG. 11).

Similarly, second inner-cell heat medium flow channel 322 is configured to include a second space 310 which is a portion of the above gap (space) in which the electrode does not exist interposed between second separator 304 and anion conductive electrolyte membrane 301, and which is sandwiched between two second walls 312 arranged to be spaced from each other. More specifically, second inner-cell heat medium flow channel 322 includes second space 310, and a second concave portion 308 located immediately above second space 310 and continuing to second space 310. Second walls 312 are formed to extend along both end portions in a width direction of second concave portion 308, and extend in the thickness direction from a surface of second separator 304 on a side facing anion conductive electrolyte membrane 301 to second surface 301b of anion conductive electrolyte membrane 301. That is, second space 310 is an internal space formed by second separator 304, anion conductive electrolyte membrane 301, and two second walls 312. Thereby, leakage of the first heat medium out of second space 310 is prevented.

Second space 310 is isolated (spatially separated) from the other portion of the gap (space) in which the electrode does not exist, cathode electrode 302, and oxidant receiving portion 306, by second walls 312 provided at peripheral edges thereof, and is in contact with only second surface 301b of anion conductive electrolyte membrane 301 of the membrane electrode assembly.

Second concave portion 308 is a concave portion provided in the surface of second separator 304 on the side facing anion conductive electrolyte membrane 301 in the region in which cathode electrode 302 does not exist, and is formed to be independent from oxidant receiving portion 306 and surround oxidant receiving portion 306.

With first or second inner-cell heat medium flow channel 321, 322 configured as described above, since it is configured such that the first heat medium passing therethrough comes into contact with only anion conductive electrolyte membrane 301, it can supply the first heat medium to only anion conductive electrolyte membrane 301 while reliably preventing leakage of the first heat medium to each electrode, and further to fuel receiving portion 307/oxidant receiving portion 306.

It is noted that, although alkaline fuel cell 300 in accordance with the present embodiment has both first inner-cell heat medium flow channel 321 on the anode side and second inner-cell heat medium flow channel 322 on the cathode side, alkaline fuel cell 300 may be configured to have only either one of them.

Next, members and the like constituting alkaline fuel cell 300 will be described in more detail.

Anion conductive electrolyte membrane 301, anode electrode 303, cathode electrode 302, and a gas diffusion layer stacked on a catalyst layer of each electrode as necessary can be configured identical to anion conductive electrolyte membrane 101, anode electrode 103, cathode electrode 102, and the gas diffusion layer constituting the alkaline fuel cell (X) described above, respectively, and the above description about the alkaline fuel cell (X) is also referred to for alkaline fuel cell 300.

As shown in FIG. 10, anode electrode 303 and cathode electrode 302 are generally provided to face each other with anion conductive electrolyte membrane 301 interposed therebetween. Generally in the alkaline fuel cell system in accordance with the present invention, anode electrode 303 and cathode electrode 302 are each formed to have an area smaller than those of anion conductive electrolyte membrane 301, first separator 305, and second separator 304. This enables construction of first space 311 and second space 310 each serving as a portion of the inner-cell heat medium flow channel, by arranging first walls 313 and second walls 312 at the gaps in which the electrodes do not exist interposed between the separators and anion conductive electrolyte membrane 301. Anode electrode 303 and cathode electrode 302 are formed at, for example, the central portion of anion conductive electrolyte membrane 301.

(First Separator and Second Separator)

First separator 305 can be a member at least having a third concave portion constituting fuel receiving portion 307 and first concave portion 309 as a portion of first inner-cell heat medium flow channel 321, in its surface facing anion conductive electrolyte membrane 301. Second separator 304 can be a member at least having a fourth concave portion constituting oxidant receiving portion 306 and second concave portion 308 as a portion of second inner-cell heat medium flow channel 322, in its surface facing anion conductive electrolyte membrane 301.

The third concave portion constituting fuel receiving portion 307 and the fourth concave portion constituting oxidant receiving portion 306 are concave portions independent from first concave portion 309 constituting first inner-cell heat medium flow channel 321 and second concave portion 308 constituting second inner-cell heat medium flow channel 322, provided in the surfaces of first separator 305 and second separator 304 on the sides facing anion conductive electrolyte membrane 301 in the regions in which anode electrode 303 and cathode electrode 302 are stacked, respectively.

The third concave portion and the fourth concave portion can each be a flow channel groove having, for example, a serpentine shape as shown in FIG. 11, or another shape. In addition, the third concave portion and the fourth concave portion can each be a tank-shaped concave portion formed to expand over a relatively wide area, or the like. The fuel introduced into fuel receiving portion 307 is supplied to anode electrode 303 arranged immediately thereabove, and the oxidant introduced into oxidant receiving portion 306 is supplied to cathode electrode 302 arranged immediately therebelow. A fuel supplying pipe 307a and a fuel emitting pipe 307b may be connected to an inlet-side end portion and an outlet-side end portion, respectively, of the third concave portion constituting fuel receiving portion 307. Similarly, an oxidant supplying pipe and an oxidant emitting pipe may be connected to an inlet-side end portion and an outlet-side end portion, respectively, of the fourth concave portion constituting oxidant receiving portion 306.

Although first concave portion 309 is one flow channel groove formed to surround fuel receiving portion 307 (third concave portion) in the example shown in FIG. 11, first concave portion 309 is not limited thereto as long as it is independent from the third concave portion constituting fuel receiving portion 307, and various forms can be adopted, considering heat exchange efficiency and the like. For example, first concave portion 309 can be, for example, a plurality of flow channel grooves, a branched flow channel groove, a tank-shaped concave portion (groove) formed to expand over a relatively wide area, or the like, to allow the first heat medium to be brought into contact with the surface of anion conductive electrolyte membrane 301, over a larger area. First concave portion 309 may be formed in an entire region or a substantially entire region of the surface of first separator 305 other than fuel receiving portion 307. The same applies to second concave portion 308 in second separator 304.

Figure 13:
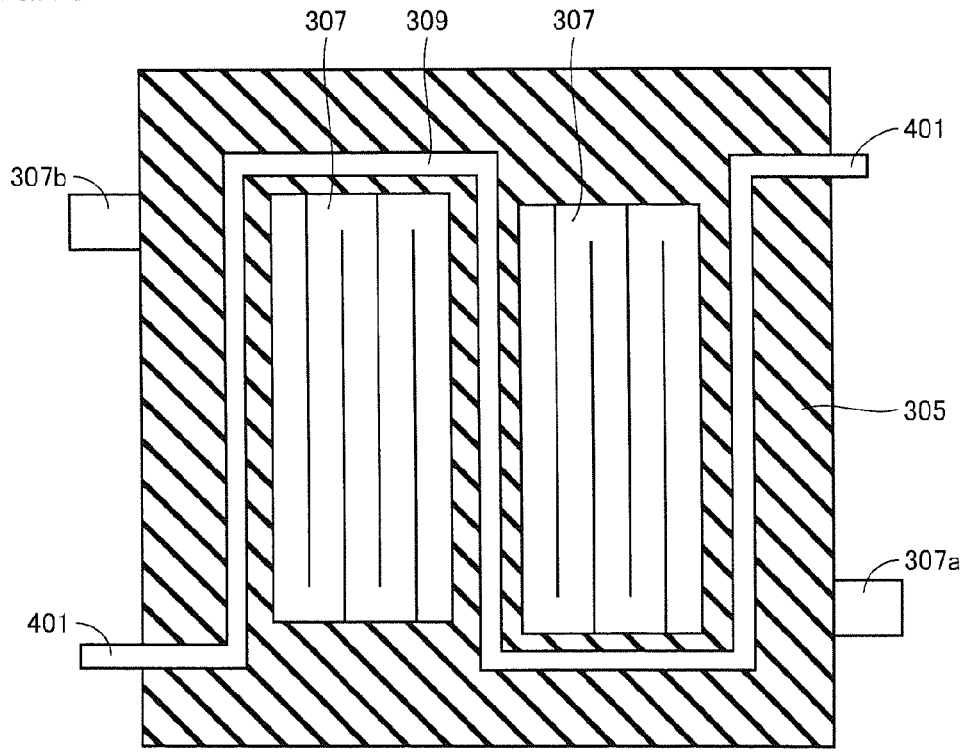
FIG. 13 is a schematic top view showing another example of the first separator of the alkaline fuel cell used in the alkaline fuel cell system in accordance with the present invention.

Further, in order to obtain good heat exchange efficiency and temperature uniformity within alkaline fuel cell 300, first concave portion 309 may be arranged in the surface of first separator 305 over as large area as possible and as uniformly as possible, for example by adopting such a configuration of dividing anode electrode 303 into a plurality, accordingly dividing fuel receiving portion 307 into a plurality, and arranging first concave portion 309 between divided fuel receiving portions 307, as shown in FIG. 13. With such a configuration, first concave portion 309 adjacent to anode electrode 303 which becomes a heat generation source during operation of the fuel cell can have a longer flow channel length, and thus the amount of heat exchange is increased and heat exchange efficiency can be improved. In addition, temperature uniformity in the surface of first separator 305 and thus temperature uniformity within alkaline fuel cell 300 can be improved. The same applies to second concave portion 308.

As each of first separator 305 and second separator 304, a so-called bipolar plate including both fuel receiving portion 307 and oxidant receiving portion 306 can also be used. In this case, the bipolar plate has the third concave portion and the first concave portion in one surface (the first surface), and has the fourth concave portion and the second concave portion in the other surface (the second surface) opposite to the first surface. When the bipolar plate is used as first separator 305, it is stacked on anode electrode 303 such that its first surface faces anion conductive electrolyte membrane 301. When the bipolar plate is used as second separator 304, it is stacked on cathode electrode 302 such that its second surface faces anion conductive electrolyte membrane 301.

Using the bipolar plate is advantageous, for example, for providing a thinner stack structure when the stack structure is constructed by stacking a plurality of single cells.

The material for first separator 305 and second separator 304 is not particularly limited, and it can be identical to that for first separator 105 and second separator 104 constituting the alkaline fuel cell (X) described above. First separator 305 and second separator 304 may each be made of an electrically non-conductive material such as a plastic material, and an anode current collecting layer and a cathode current collecting layer may be provided additionally. In this case, these current collecting layers are arranged, for example, between the respective electrodes and separators.

As described above, in alkaline fuel cell 300, first inner-cell heat medium flow channel 321 includes first concave portion 309 formed in the surface of first separator 305, and first space 311 continuing to first concave portion 309, sandwiched between first walls 313, and second inner-cell heat medium flow channel 322 includes second concave portion 308 formed in the surface of second separator 304, and second space 310 continuing to second concave portion 308, sandwiched between second walls 312.

First walls 313 and second walls 312 are walls isolating first space 311 and second space 310 each serving as a portion of the inner-cell heat medium flow channel, respectively, from the other portions of the gaps (spaces) in which the electrodes do not exist, the electrodes, and fuel receiving portion 307/oxidant receiving portion 306, and each extend in the thickness direction from the surface of each separator on the side facing anion conductive electrolyte membrane 301 to the surface of anion conductive electrolyte membrane 301.

First walls 313 and second walls 312 are formed to be substantially parallel to first concave portion 309 and second concave portion 308, respectively, to extend along both end portions in the width direction of the respective concave portions (see FIG. 12). First walls 313 and second walls 312 may be formed to cover all of the gaps (spaces) in which the electrodes do not exist, other than first space 311 and second space 310 each serving as a portion of the inner-cell heat medium flow channel. In that case, when first separator 305 and second separator 304 of alkaline fuel cell 300 are fastened with a fastening member or the like, stress is equalized and stability is improved. Fastening between first separator 305 and second separator 304 can be performed using a fastening member such as a screw, a bolt, and a nut.

Further, first walls 313 and second walls 312 may be arranged to be partially fit into grooves formed to be substantially parallel to first concave portion 309 and second concave portion 308, respectively, to extend along both end portions in the width direction of the respective concave portions. Such a configuration facilitates positioning of the first walls and the second walls during assembly of the alkaline fuel cell, and improves productivity. In addition, since the configuration can prevent misalignment of first walls 313 and second walls 312, it can provide a highly reliable alkaline fuel cell.

The material for first wall 313 and second wall 312 is not particularly limited as long as it is resistant to the first heat medium and it is impermeable to the first heat medium. Examples thereof can include: an elastic body such as butyl rubber, ethylene-propylene rubber, chloroprene rubber, nitrile rubber, silicone rubber, tetrafluoroethylene-propylene rubber, and tetrafluoroethylene-perfluoromethylvinylidene-based rubber; a non-elastic body such as a thermoplastic resin represented by tetrafluoroethylene, polypropylene, and polymethylpentene, and a metal or an alloy represented by stainless steel; and the like.

In particular, first wall 313 and second wall 312 are each preferably made of an elastic body. By using elastic walls as isolation walls interposed between each separator and anion conductive electrolyte membrane 301 and forming a portion of an inner-cell heat medium flow channel space, good surface contact can be achieved between the elastic walls and each separator as well as anion conductive electrolyte membrane 301 by utilizing deformation of the elastic walls caused by applying pressure in the thickness direction of the alkaline fuel cell. Thereby, sealing properties at these interfaces can be improved, and leakage of the first heat medium to each electrode and further to fuel receiving portion 307/oxidant receiving portion 306 can be prevented more reliably.

Further, even when a sufficient pressure is applied in the thickness direction of the alkaline fuel cell by fastening between first separator 305 and second separator 304 to obtain good sealing properties at the interfaces between the elastic walls and each separator as well as anion conductive electrolyte membrane 301 and an effect of sufficiently decreasing contact resistance between each electrode and each separator, use of the elastic walls which are appropriately crushed by the pressure and generate a repulsion force can effectively prevent an increase in material diffusion resistance due to excessive crushing of the electrodes and resultant blockage of pores.

When a large pressure is applied in the thickness direction of the alkaline fuel cell, it is necessary to thicken the separators or use a thick fastening member (bolt, nut) in order to prevent destruction by stress, which leads to an increase in size of the alkaline fuel cell. Therefore, from the viewpoint of obtaining the above sealing properties relatively easily and downsizing the alkaline fuel cell, if first wall 313 and second wall 312 are each made of an elastic body, they are preferably deformed with a relatively small pressure. Specifically, first wall 313 and second wall 312 preferably have a Young's modulus of less than 100 MPa.

From the viewpoint of increasing a sealing area in order to reliably prevent leakage of the first head medium to fuel receiving portion 307 and oxidant receiving portion 306, first wall 313 and second wall 312 preferably have a width of not less than 1 mm. On the other hand, from the viewpoint of shortening a heat diffusion path from inner-cell heat medium flow channel 320 to anode electrode 303 and cathode electrode 302 in order to increase heat flux to anode electrode 303 and cathode electrode 302 which become heat generation sources during operation of the fuel cell, first wall 313 and second wall 312 preferably have a width of less than 5 mm.

Inner-cell heat medium flow channel 321, 322 is not limited to a configuration including a concave portion formed in the surface of each separator and a space continuing thereto, as long as it is configured to bring the passing first heat medium into contact with only anion conductive electrolyte membrane 301 of the membrane electrode assembly. For example, as for first inner-cell heat medium flow channel 321, referring to FIG. 10, a configuration of using a first separator in which a portion in first separator 305 in which first concave portion 309 is formed protrudes more than a portion thereof in which fuel receiving portion 307 is formed to the extent that it comes into contact with first surface 301a of anion conductive electrolyte membrane 301, and omitting first walls 313 may be adopted. In this case, first inner-cell heat medium flow channel 321 includes only first concave portion 309. The same applies to second inner-cell heat medium flow channel 322.

Since first separator 305 and second separator 304 described above are produced by forming first concave portion 309 and second concave portion 308 in the surfaces of the separators, respectively, they have a simple structure when compared with a case where a heat medium flow channel is formed inside each separator. Therefore, they are advantageous for reducing manufacturing cost and simplifying manufacturing process of the alkaline fuel cell.

(First Heat Medium)

As the first heat medium, a known heat medium can be used, including a gas such as air, water vapor, chlorofluorocarbon, hydrochlorofluorocarbon, and hydrofluorocarbon; and a liquid such as water, an aqueous solution, oil, and ethylene glycol. However, from the viewpoint of high heat capacity and capability of efficient heat exchange as well as ease of handling, it is preferable to use a liquid, and it is more preferable to use water or an aqueous solution. In adjusting the temperature of alkaline fuel cell 300, use of an extremely high or low heat medium is not necessarily required, and the temperature can be sufficiently adjusted with a heat medium mainly composed of water. In addition, using water or an aqueous solution as the first heat medium is also advantageous in the following points:

(a) Since anion conductive electrolyte membrane 301 can be directly humidified by the first heat medium, and moisture can be supplied to cathode electrode 302 through anion conductive electrolyte membrane 301, a humidifier for humidifying the fuel and/or the oxidant that has been conventionally required can be omitted, which is advantageous for downsizing the fuel cell system. Further, by humidifying anion conductive electrolyte membrane 301, power generation efficiency and starting performance (time required to obtain a desired output from the beginning of power generation) can be improved;

(b) When an alkaline aqueous solution is used as the first heat medium, $CO_2$-derived anions such as $CO_3^{2-}$ and $HCO_3^-$ existing in anion conductive electrolyte membrane 301, and $CO_2$-derived anions existing in anode electrode 303 and cathode electrode 302 adjacent thereto can be neutralized, and accumulation of the anions into anode electrode 303 can be effectively prevented. Examples of alkali added to the alkaline aqueous solution can be the same as those described for the above alkaline fuel cell (Y).

Even when the alkaline aqueous solution as the first heat medium is supplied through inner-cell heat medium flow channel 320, the first heat medium is supplied to only anion conductive electrolyte membrane 301 without coming into contact with the electrodes, and thus blockage of pores in the electrodes due to precipitation of salt generated by neutralization and resultant decrease in power generation efficiency do not occur. Further, since counter cations of alkali do not enter anion conductive electrolyte membrane 301, precipitation of salt does not occur in anion conductive electrolyte membrane 301.

From the viewpoint of promoting neutralization in anion conductive electrolyte membrane 301 more efficiently, supply of the alkaline aqueous solution as the first heat medium is preferably performed using first inner-cell heat medium flow channel 321 which can bring the first heat medium into contact with the surface of anion conductive electrolyte membrane 301 on the side facing anode electrode 303 into which $CO_2$-derived anions may accumulate.

One of preferable embodiments is to provide both first and second inner-cell heat medium flow channels 321, 322 and pass different types of heat medium therethrough. As a more specific example, first inner-cell heat medium flow channel 321 on the anode side is used as a supply channel for an alkaline aqueous solution, and second inner-cell heat medium flow channel 322 on the cathode side is used as a supply channel for liquid water. According to such an embodiment, neutralization of $CO_2$-derived anions can be promoted by supplying the alkaline water to anode electrode 303 into which $CO_2$-derived anions may accumulate, and at the same time moisture supply to cathode electrode 302 can be promoted by supplying the liquid water made of only water in the form of a liquid to cathode electrode 302 where water is required for an electrochemical reaction. Although different types of head medium are passed in this embodiment, separators in the same shape can be used as first separator 305 and second separator 304, and thus the alkaline fuel cell can be manufactured through the same manufacturing process as that in the case where the same type of head medium is passed. When different types of heat medium are passed, two heat medium circulation flow channels (heat medium flow channels) are accordingly provided.

(Fuel and Oxidant)

The fuel and the oxidant used for alkaline fuel cell 300 can be the same as those described for the above alkaline fuel cell (X). Since the oxidant reacts with water at cathode electrode 302, humidified $O_2$ gas or air may be supplied to supply water to cathode electrode 302.

It is noted that, if a hydrocarbon compound such as hydrocarbon gas or alcohol (such as methanol) is used as the fuel, carbon dioxide is generated as a reaction product at the anode electrode. Therefore, in a conventional alkaline fuel cell, carbonation of the anion conductive electrolyte membrane and the anode electrode (accumulation of $CO_2$-derived anions) significantly proceeds. However, with alkaline fuel cell 300 used in the present invention, the alkaline aqueous solution can be supplied through inner-cell heat medium flow channel 320, and thus, even if such a fuel is used, accumulation of $CO_2$-derived anions into the anode electrode can be effectively suppressed.

[First Heat Medium Circulation Portion and First Heat Exchange Portion]

First heat medium circulation portion 400 includes outer-cell heat medium flow channel 401 connected to inner-cell heat medium flow channel 320 and first heat medium circulation apparatus 402, and is provided for circulating the first heat medium in the first heat medium flow channel including inner-cell heat medium flow channel 320 and outer-cell heat medium flow channel 401. When different types of heat medium are supplied to first and second inner-cell heat medium flow channels 321, 322 as described above, two first heat medium flow channels can be provided. First heat medium circulation apparatus 402 can be a circulation pump or the like interposed in the first heat medium flow channel.

First heat exchange portion 500 adjusts the temperature of the first heat medium by heat exchange with the first heat medium within outer-cell heat medium flow channel 401. First heat exchange portion 500 includes a third heat medium performing heat exchange with the first heat medium, and is generally arranged such that the third heat medium comes into contact with at least a portion of outer-cell heat medium flow channel 401. Specifically, first heat exchange portion 500 can be a tank housing the third heat medium, a jacket provided around outer-cell heat medium flow channel 401 for passing the third heat medium therethrough, or the like.

As the third heat medium, a heat medium described above as an example of the first heat medium can also be used. First heat exchange portion 500 may have temperature adjustment means for adjusting the temperature of the third heat medium.

With alkaline fuel cell system 10 configured as described above, adjustment of the temperature within alkaline fuel cell 300 (heating/cooling) can be performed with high heat exchange efficiency and high accuracy, using the first heat medium having a predetermined temperature. One advantage of alkaline fuel cell system 10 in accordance with the present embodiment is that quick cooling of alkaline fuel cell 300, which has been conventionally difficult, can be performed (the same applies to the embodiments described later). The self purge operation of carbon dioxide ($CO_2$) in an atmosphere in which the electrolyte of the electrolyte membrane and the catalyst layer of alkaline fuel cell 300 absorbs $CO_2$ is effective to decrease the concentration of the $CO_2$-derived anions described above, and the concentration of the $CO_2$-derived anions is quickly decreased by performing the self purge operation under a high temperature. However, if an ordinary fuel cell operation (power generation) is continued at the high temperature, deterioration of anion conductive electrolyte membrane 301 proceeds. Thus, by performing quick cooling after the self purge operation is finished and before the ordinary fuel cell operation is started, such deterioration of anion conductive electrolyte membrane 301 can be suppressed.

It is noted that the self purge operation refers to an operation in which, by passing a current larger than that used during the ordinary fuel cell operation between the anode electrode and the cathode electrode of the alkaline fuel cell, $CO_2$-derived anions contained in the anion conductive electrolyte membrane and the catalyst layer move to the anode electrode, are reduced by the fuel, and emitted as $CO_2$ gas from the anode electrode. The self purge operation can be specifically represented by formulas (5) and (6) described above.

(2) Second Embodiment

Figure 14:
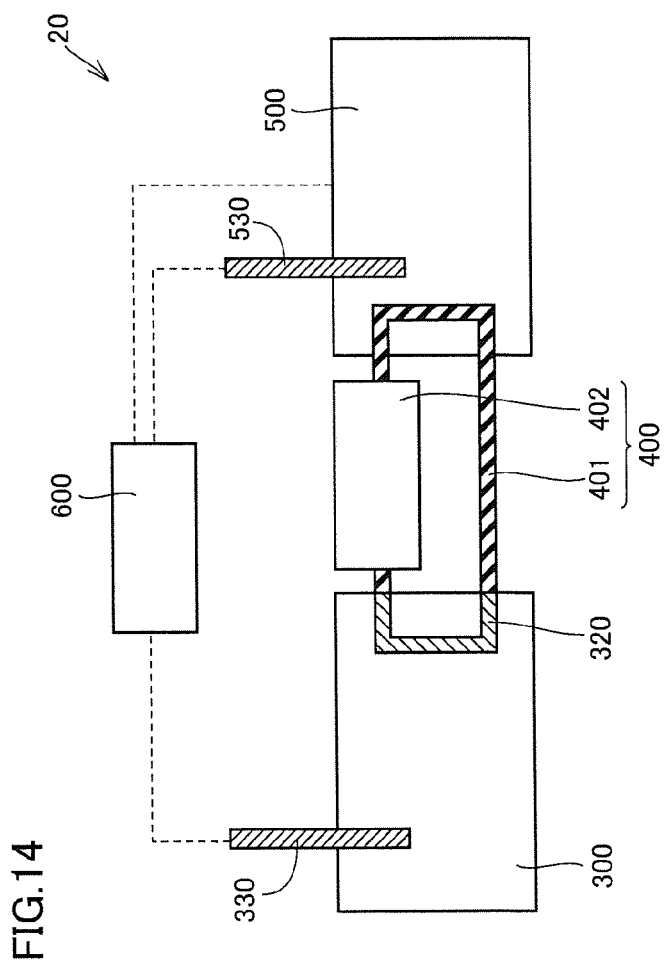
FIG. 14 is a schematic view showing another example of the alkaline fuel cell system in accordance with the present invention.

FIG. 14 is a schematic view showing a configuration of an alkaline fuel cell system 20 in accordance with the present embodiment. Alkaline fuel cell system 20 is the same, as that in the first embodiment described above, except that it further includes first temperature detection portion 330 for detecting a temperature within alkaline fuel cell 300, a second temperature detection portion 530 for detecting a temperature within first heat exchange portion 500 (temperature of the third heat medium within first heat exchange portion 500), and a control portion 600 for controlling an amount of heat exchange by first heat exchange portion 500 based on one or both of results of detection by these temperature detection portions. In the present embodiment, first heat exchange portion 500 has temperature adjustment means for adjusting the temperature of the third heat medium.

To control the amount of heat exchange specifically means to adjust or maintain a temperature difference between the first heat medium and the third heat medium within first heat exchange portion 500 to be a desired value. With alkaline fuel cell system 20 in accordance with the present embodiment, the temperature of alkaline fuel cell 300 can be adjusted more quickly or more accurately. For example, if the temperature of alkaline fuel cell 300 is higher than a desired temperature, alkaline fuel cell 300 can be quickly cooled by sufficiently decreasing the temperature of the third heat medium such that the temperature difference between the first heat medium and the third heat medium becomes smaller.

Although first temperature detection portion 330 is not particularly limited, it can be installed, for example, to be inserted into first separator 305 or second separator 304 as shown in FIG. 10. Second temperature detection portion 530 can be installed to be immersed in the third heat medium. As the temperature detection portion, an ordinary temperature detector, for example, a thermocouple, a resistance temperature sensor, a thermistor, or the like can be used.

Control portion 600 is not particularly limited, and, for example, a personal computer or the like can be used. Control portion 600 may adjust the temperature of the third heat medium based on either one result of detection by first temperature detection portion 330 or second temperature detection portion 530, or based on both results of detection by first temperature detection portion 330 and second temperature detection portion 530. In the latter case, the temperature of alkaline fuel cell 300 can be adjusted by referring to the temperature within alkaline fuel cell 300, the temperature of the third heat medium within first heat exchange portion 500, and also a temperature difference therebetween, and thus quickness and accuracy of temperature adjustment can be further improved. On the other hand, in the former case, if only second temperature detection portion 530 is installed in the system, such a system is advantageous in terms of simplifying manufacturing process and decreasing manufacturing cost of alkaline fuel cell 300. It is noted that, in the former case, installation of the temperature detection portion not used can be omitted.

In addition to or instead of controlling first heat exchange portion 500, control portion 600 may control a circulation flow rate of the first heat medium circulated in the first heat medium flow channel. Control of the circulation flow rate of the first heat medium can be performed by connecting control portion 600 and first heat medium circulation apparatus 402 and controlling an amount of driving first heat medium circulation apparatus 402. Also by adjusting the amount of driving first heat medium circulation apparatus 402, the temperature of alkaline fuel cell 300 can be adjusted through controlling the amount of heat exchange between alkaline fuel cell 300 and the first heat medium and the amount of heat exchange between the third heat medium and the first heat medium. Combination of controlling first heat exchange portion 500 and controlling the circulation flow rate of the first heat medium is more advantageous for further improving quickness and accuracy of adjusting the temperature of alkaline fuel cell 300.

It is noted that, also when the temperature of alkaline fuel cell 300 is adjusted only by controlling the circulation flow rate of the first heat medium, such control is preferably performed based on one or both of the results of detection by first temperature detection portion 330 for detecting the temperature within alkaline fuel cell 300 and second temperature detection portion 530 for detecting the temperature within first heat exchange portion 500 (temperature of the third heat medium within first heat exchange portion 500).

(3) Third Embodiment

Figure 15:
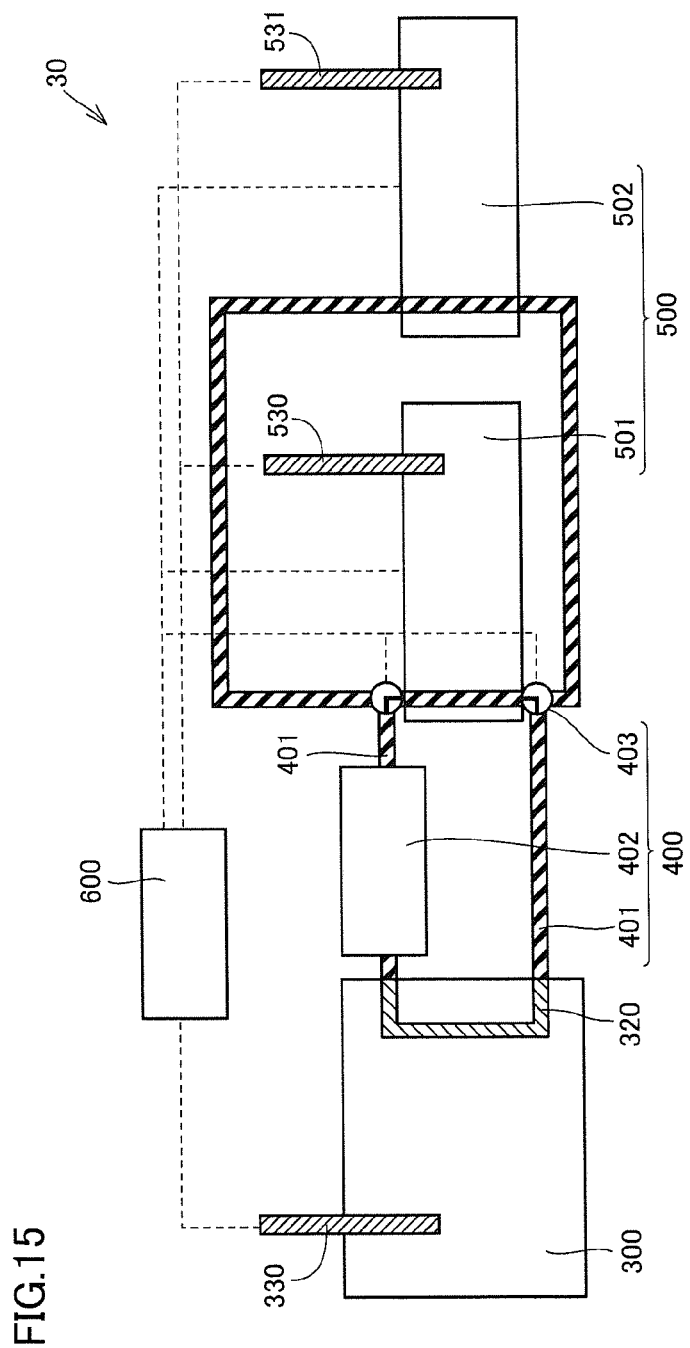
FIG. 15 is a schematic view showing still another example of the alkaline fuel cell system in accordance with the present invention.

FIG. 15 is a schematic view showing a configuration of an alkaline fuel cell system 30 in accordance with the present embodiment. Alkaline fuel cell system 30 is the same as that in the second embodiment described above, except that first heat exchange portion 500 has a heating heat exchange portion 501 for heating the first heat medium and a cooling heat exchange portion 502 for cooling the first heat medium, and connection between outer-cell heat medium flow channel 401 and heating heat exchange portion 501 or cooling heat exchange portion 502 is switchable by a switching valve 403. In the present embodiment, control portion 600 is also connected to switching valve 403 to control a switching operation of switching valve 403.

With alkaline fuel cell system 30 in accordance with the present embodiment, since heating heat exchange portion 501 including a heated heat medium and cooling heat exchange portion 502 including a cooled heat medium are prepared beforehand, if it is necessary to heat or cool alkaline fuel cell 300, such temperature adjustment can be quickly performed. For example, the self purge operation is performed while maintaining the first heat medium at an appropriate temperature using heating heat exchange portion 501, and thereafter switching valve 403 is switched to connect outer-cell heat medium flow channel 401 and cooling heat exchange portion 502 to quickly cool alkaline fuel cell 300 in order to perform the ordinary fuel cell operation.

Heating heat exchange portion 501 and cooling heat exchange portion 502 each may have or may not have temperature adjustment means for adjusting the temperature of the third heat medium. As in the second embodiment described above, control portion 600 can control the amount of heat exchange between the first heat medium and the third heat medium within first heat exchange portion 500 (i.e., switch switching valve 403) based on one or more of the results of detection by first temperature detection portion 330 for detecting the temperature within alkaline fuel cell 300, second temperature detection portion 530 for detecting the temperature within heating heat exchange portion 501, and a third temperature detection portion 531 for detecting the temperature within cooling heat exchange portion 502. Installation of the temperature detection portion not used can be omitted.

(4) Fourth Embodiment

FIG. 16 is a schematic view showing a configuration of an alkaline fuel cell system 40 in accordance with the present embodiment. Alkaline fuel cell system 40 is the same as that in the first embodiment described above, except that it further includes a second heat medium circulation portion 700 including a second heat medium flow channel 701 and a second heat medium circulation apparatus 702 for circulating a second heat medium in first heat exchange portion 500, and a second heat exchange portion 800 including a fourth heat medium for performing heat exchange with the second heat medium within second heat medium flow channel 701.

Second heat medium circulation portion 700 (second heat medium flow channel 701, second heat medium circulation apparatus 702, and the second heat medium) may have the same configuration as that of first heat medium circulation portion 400 (the first heat medium flow channel, first heat medium circulation apparatus 402, and the first heat medium). Second heat exchange portion 800 performs heat exchange between the fourth heat medium included therein and the second heat medium within second heat medium flow channel 701, and is generally arranged such that the fourth heat medium comes into contact with at least a portion of second heat medium flow channel 701. Second heat exchange portion 800 can be used as a heat storage tank, and specifically it can be a tank housing the fourth heat medium, or the like. As the fourth heat medium, a heat medium described above as an example of the first heat medium can also be used. Typically, the fourth heat medium is water.

With alkaline fuel cell system 40 in accordance with the present embodiment, if the fourth heat medium is for example water, heat generated by power generation of alkaline fuel cell 300 can be recovered as hot water. The obtained hot water can be efficiently utilized for, for example, hot-water supply, space heating, and the like.

EXAMPLES

Hereinafter, the present invention will be described in more detail with reference to examples. However, it is noted that the present invention is not limited thereto.

Example 1

An alkaline fuel cell having the same configuration as that of the alkaline fuel cell shown in FIGS. 1 and 2 was fabricated through a procedure described below.

(1) Fabrication of Membrane Electrode Assembly

A copolymer of aromatic polyether sulfonic acid and aromatic polythioether sulfonic acid is chloromethylated and then aminated to obtain an anion conductive solid polymer electrolyte for a catalyst layer. The electrolyte was added to tetrahydrofuran to obtain a 5 weight % solution of the anion conductive solid polymer electrolyte.

Catalyst-supporting carbon particles as Pt/C having a Pt supporting amount of 50 weight % ("TEC10E50E" manufactured by Tanaka Kikinzoku) and the electrolyte solution obtained above were mixed at a weight ratio of 2/0.2, and ion-exchange water and ethanol were further added thereto to prepare catalyst paste for an anode catalyst layer.

Similarly, catalyst-supporting carbon particles as Pt/C having a Pt supporting amount of 50 weight % ("TEC10E50E" manufactured by Tanaka Kikinzoku) and the electrolyte solution obtained above were mixed at a weight ratio of 2/0.2, and ion-exchange water and ethanol were further added thereto to prepare catalyst paste for a cathode catalyst layer.

Next, carbon paper ("TGP-H-060" manufactured by Toray, with a thickness of about 190 μm) was cut to a size of 22.3 mm (length)×22.3 mm (width) as an anode gas diffusion layer. The catalyst paste for the anode catalyst layer described above was applied on one surface of the anode gas diffusion layer at a catalyst amount of 0.5 mg/cm$^2$ using a screen printing plate having a window of 22.3 mm (length)×22.3 mm (width), and dried at room temperature, to fabricate anode electrode 103 in which the anode catalyst layer was formed over one surface of the carbon paper as the anode gas diffusion layer. Obtained anode electrode 103 had a thickness of about 200 μm.

Similarly, carbon paper ("TGP-H-060" manufactured by Toray, with a thickness of about 190 μm) was cut to a size of 22.3 mm (length)×22.3 mm (width) as a cathode gas diffusion layer. The catalyst paste for the cathode catalyst layer described above was applied on one surface of the cathode gas diffusion layer at a catalyst amount of 0.5 mg/cm$^2$ using a screen printing plate having a window of 22.3 mm (length)× 22.3 mm (width), and dried at room temperature, to fabricate cathode electrode 102 in which the cathode catalyst layer was formed over one surface of the carbon paper as the cathode gas diffusion layer. Obtained cathode electrode 102 had a thickness of about 200 μm.

Next, a fluorine resin-based polymer electrolyte ("Aciplex" manufactured by Asahi Kasei) cut to a size of 90 mm×90 mm was used as anion conductive electrolyte membrane 101, and anode electrode 103, anion conductive electrolyte membrane 101, and cathode electrode 102 were stacked in this order such that the respective catalyst layers faced anion conductive electrolyte membrane 101. Thereafter, thermocompression bonding was performed at 130° C., 10 kN, for two minutes to bond anode electrode 103 and cathode electrode 102 to anion conductive electrolyte membrane 101, and thereby a membrane electrode assembly was obtained. The stacking described above was performed such that anode electrode 103 and cathode electrode 102 were located at the same position in surfaces of anion conductive electrolyte membrane 101, and the centers of anode electrode 103, anion conductive electrolyte membrane 101, and cathode electrode 102 matched each other.

(2) Fabrication of Alkaline Fuel Cell

Two members made of a carbon material, each having an outer shape of 90 mm (length)×90 mm (width)×20 mm (thickness) and having a flow channel groove (fuel receiving portion 107 and first concave portion 109 constituting a portion of first alkaline aqueous solution supply portion 120, or oxidant receiving portion 106 and second concave portion 108 constituting a portion of second alkaline aqueous solution supply portion 121) as shown in FIG. 2 formed in one surface, were prepared and used as first separator 105 and second separator 104 having a current collecting function. Fuel receiving portion 107 in first separator 105 is a serpentine flow channel groove as shown in FIG. 2 (with a flow channel width of 800 μm and a flow channel depth of 800 μm). A region in which fuel receiving portion 107 is formed is located at the center of first separator 105, and has a size of 22.3 mm (length)×22.3 mm (width). Further, first concave portion 109 constituting a portion of first alkaline aqueous solution supply portion 120 has a width of 800 μm and a depth of 800 μm, and is formed to surround fuel receiving portion 107. The same applies to second separator 104.

Two sheets of tetrafluoroethylene-propylene rubber (with a thickness of 180 μm) as shown in FIG. 3 was used as first walls 113 and arranged at positions as shown in FIG. 3 on first separator 105. The same applies to second walls 112.

Subsequently, on the anode gas diffusion layer of the membrane electrode assembly obtained above in (1), first separator 105 was stacked such that its groove-formed surface faced the anode gas diffusion layer, and first space 111 between first walls 113 was arranged immediately above first concave portion 109 (anode electrode 103 was arranged immediately above fuel receiving portion 107). Similarly, on the cathode gas diffusion layer, second separator 104 was stacked such that its groove-formed surface faced the cathode gas diffusion layer, and second space 110 between second walls 112 was arranged immediately below second concave portion 108 (cathode electrode 102 was arranged immediately below oxidant receiving portion 106). Alkaline fuel cell 100 was obtained by fastening first separator 105 and second separator 104 with a bolt and a nut.

Example 2

An alkaline fuel cell was fabricated as in Example 1, using the second separator identical to that used in Example 1 except that it did not have second concave portion 108. However, installation of second walls 112 was omitted.

Comparative Example 1

An alkaline fuel cell was fabricated as in Example 1, using the first separator identical to that used in Example 1 except that it did not have first concave portion 109, and using the second separator identical to that used in Example 1 except that it did not have second concave portion 108. However, installation of first walls 113 and second walls 112 was omitted.

[Evaluation of Power Generation Characteristics of Alkaline Fuel Cell]

The alkaline fuel cells of Examples 1 and 2 and Comparative Example 1 were operated to generate electric power and their power generation characteristics were evaluated, through a procedure described below. Each alkaline fuel cell was placed in a constant-temperature tank at 50° C. Humidified H$_2$ gas (relative humidity: 95%) was supplied to fuel receiving portion 107 of the alkaline fuel cell at a flow rate of 200 mL/min., and humidified air (relative humidity: 95%) was supplied to oxidant receiving portion 106 of the alkaline fuel cell at a flow rate of 500 mL/min. First separator 105 and second separator 104 were electrically connected, and power generation was performed at a current of 0.2 A/cm$^2$ for 30 minutes. A cell resistance and a cell voltage at a time point when power generation was performed for 30 minutes were measured with a potentiostat/galvanostat (AUTOLAB PGSTAT30/FRA2 and AUTOLAB BSTR10A manufacture by ECO CHEMI).

In the alkaline fuel cell of Example 1, a 5 weight % KOH aqueous solution was supplied to each of first alkaline aqueous solution supply portion 120 and second alkaline aqueous solution supply portion 121 of the alkaline fuel cell from the beginning of power generation, at a flow rate of 5 mL/min. In the alkaline fuel cell of Example 2, a 5 weight % KOH aqueous solution was supplied to first alkaline aqueous solution supply portion 120 of the alkaline fuel cell from the beginning of power generation, at a flow rate of 5 mL/min Table 1 shows results of measurement of the cell resistances and the cell voltages.

TABLE 1

|  | Cell Resistance (m$\Omega$cm$^2$) | Cell Voltage (V) |
| --- | --- | --- |
| Example 1 | 150 | 0.850 |
| Example 2 | 155 | 0.845 |
| Comparative Example 1 | 200 | 0.800 |

Example 3

An alkaline fuel cell having the same configuration as that of the alkaline fuel cell shown in FIGS. 5 and 6 was fabricated through a procedure described below.

A membrane electrode assembly was fabricated as in Example 1. Next, two members made of a carbon material, each having an outer shape of 90 mm (length)×90 mm (width)×20 mm (thickness) and having a flow channel groove (fuel receiving portion 207 and first concave portion 209 constituting a portion of first liquid water supply flow channel 220, or oxidant receiving portion 206 and second concave portion 208 constituting a portion of second liquid water supply flow channel 221) as shown in FIG. 6 formed in one surface, were prepared and used as first separator 205 and second separator 204 having a current collecting function. Fuel receiving portion 207 in first separator 205 is a serpentine flow channel groove as shown in FIG. 6 (with a flow channel width of 800 μm and a flow channel depth of 800 μm). A region in which fuel receiving portion 207 is formed is located at the center of first separator 205, and has a size of 22.3 mm (length)×22.3 mm (width). Further, first concave portion 209 constituting a portion of first liquid water supply flow channel 220 has a width of 800 μm and a depth of 800 μm, and is formed to surround fuel receiving portion 207. The same applies to second separator 204.

Two sheets of tetrafluoroethylene-propylene rubber (with a thickness of 180 μm) as shown in FIG. 7 was used as first elastic walls 213 and arranged at positions as shown in FIG. 7 on first separator 205. The same applies to second elastic walls 212.

Subsequently, on the anode gas diffusion layer of the membrane electrode assembly obtained above, first separator 205 was stacked such that its groove-formed surface faced the anode gas diffusion layer, and first space 211 between first elastic walls 213 was arranged immediately above first concave portion 209 (anode electrode 203 was arranged immediately above fuel receiving portion 207). Similarly, on the cathode gas diffusion layer, second separator 204 was stacked such that its groove-formed surface faced the cathode gas diffusion layer, and second space 210 between second elastic walls 212 was arranged immediately below second concave portion 208 (cathode electrode 202 was arranged immediately below oxidant receiving portion 206). Alkaline fuel cell 200 was obtained by fastening first separator 205 and second separator 204 with a bolt and a nut.

Example 4

An alkaline fuel cell was fabricated as in Example 3, using the first separator identical to that used in Example 3 except that it did not have first concave portion 209. However, installation of first elastic walls 213 was omitted.

Comparative Example 2

An alkaline fuel cell was fabricated as in Example 3, except that a polytetrafluoroethylene sheet with a thickness of 180 μm was used instead of first elastic wall 213 and second elastic wall 212.

Comparative Example 3

An alkaline fuel cell was fabricated as in Example 3, except that, of the two members constituting each of first elastic walls 213 and second elastic walls 212, the member close to fuel receiving portion 207 or oxidant receiving portion 206 (i.e., the member arranged between fuel receiving portion 207 or oxidant receiving portion 206 and first concave portion 209 or second concave portion 208) was omitted.

Comparative Example 4

An alkaline fuel cell was fabricated as in Example 3, using the first separator identical to that used in Example 3 except that it did not have first concave portion 209, and using the second separator identical to that used in Example 3 except that it did not have second concave portion 208. However, installation of first elastic walls 213 and second elastic walls 212 was omitted.

[Evaluation of Power Generation Characteristics of Alkaline Fuel Cell]

The alkaline fuel cells of Examples 3 and 4 and Comparative Examples 2 to 4 were operated to generate electric power and their power generation characteristics were evaluated, through a procedure described below. Each alkaline fuel cell was placed in a constant-temperature tank at 50° C. Humidified $H_2$ gas (relative humidity: 95%) was supplied to fuel receiving portion 207 of the alkaline fuel cell at a flow rate of 200 mL/min., and non-humidified air (relative humidity: 50%) was supplied to oxidant receiving portion 206 of the alkaline fuel cell at a flow rate of 500 mL/min. First separator 205 and second separator 204 were electrically connected, and power generation was performed at a current of 0.2 A/cm$^2$ for 60 minutes. Cell resistances and cell voltages at time points when power generation was performed for 30 minutes and for 60 minutes were measured with a potentiostat/galvanostat (AUTOLAB PGSTAT30/FRA2 and AUTOLAB BSTR10A manufacture by ECO CHEMI).

In each of the alkaline fuel cells of Example 3 and Comparative Examples 2 and 3, liquid water (100% water) was supplied to each of first liquid water supply flow channel 220 and second liquid water supply flow channel 221 of the alkaline fuel cell from the beginning of power generation, at a flow rate of 5 mL/min. In the alkaline fuel cell of Example 4, liquid water (100% water) was supplied to second liquid water supply flow channel 221 of the alkaline fuel cell from the beginning of power generation, at a flow rate of 5 mL/min. Table 2 shows results of measurement of the cell resistances and the cell voltages.

TABLE 2

| | Power Generation for 30 Minutes | | Power Generation for 60 Minutes | |
|---|---|---|---|---|
| | Cell Resistance (mΩcm$^2$) | Cell Voltage (V) | Cell Resistance (mΩcm$^2$) | Cell Voltage (V) |
| Example 3 | 155 | 0.84 | 155 | 0.84 |
| Example 4 | 165 | 0.83 | 160 | 0.84 |
| Comparative Example 2 | 180 | 0.82 | 160 | 0.74 |
| Comparative Example 3 | 170 | 0.81 | 155 | 0.62 |
| Comparative Example 4 | 250 | 0.78 | 300 | 0.70 |

In Examples 3 and 4, good cell voltages and low cell resistances were exhibited, which indicates that moisture is sufficiently supplied to anion conductive electrolyte membrane 201 and cathode electrode 202.

In contrast, in Comparative Examples 2 and 3, although the cell resistances were relatively low, the cell voltages measured after power generation for 60 minutes were significantly low. In Comparative Example 2, it is presumed that, since the polytetrafluoroethylene sheet was used instead of the first elastic wall and the second elastic wall, a gap was produced between the polytetrafluoroethylene sheet and each separator or between the polytetrafluoroethylene sheet and anion conductive electrolyte membrane 201, and the liquid water entered anode electrode 203 or cathode electrode 202 and caused flooding. Similarly in Comparative Example 3, it is presumed that, since the elastic member was partially omitted, the liquid water entered anode electrode 203 or cathode electrode 202 through a gap between each separator and anion conductive electrolyte membrane 201, and caused flooding. In Comparative Example 4, high cell resistances and significantly low cell voltages were exhibited. It is presumed that, since the liquid water supply flow channel was not provided, supply of moisture to anion conductive electrolyte membrane 201 and cathode electrode 202 was insufficient, which results in such low cell characteristics.

Example 5

An alkaline fuel cell system having the same configuration as that shown in FIG. 9, including an alkaline fuel cell having the same configuration as that shown in FIG. 10, was fabricated through a procedure described below.

(1) Fabrication of Alkaline Fuel Cell

A membrane electrode assembly was fabricated as in Example 1. Next, two members made of a carbon material, each having an outer shape of 90 mm (length)×90 mm (width)×20 mm (thickness) and having a flow channel groove (fuel receiving portion 307 and first concave portion 309, or oxidant receiving portion 306 and second concave portion 308) as shown in FIG. 11 formed in one surface, were prepared and used as first separator 305 and second separator 304 having a current collecting function. Fuel receiving portion 307 in first separator 305 is a serpentine flow channel groove as shown in FIG. 11 (with a flow channel width of 800 μm and a flow channel depth of 800 μm). A region in which fuel receiving portion 307 is formed is located at the center of first separator 305, and has a size of 22.3 mm (length)×22.3 mm (width). Further, first concave portion 309 constituting a portion of first inner-cell heat medium flow channel 321 has a width of 800 μm and a depth of 800 μm, and is formed to surround fuel receiving portion 307. The same applies to second separator 304. A hole for inserting a thermocouple was formed in second separator 304 at a position as shown in FIG. 10.

Two sheets of tetrafluoroethylene-propylene rubber (with a thickness of 180 μm) as shown in FIG. 12 was used as first walls 313 and arranged at positions as shown in FIG. 12 on first separator 305. The same applies to second walls 312.

Subsequently, on the anode gas diffusion layer of the membrane electrode assembly obtained above, first separator 305 was stacked such that its groove-formed surface faced the anode gas diffusion layer, and first space 311 between first walls 313 was arranged immediately above first concave portion 309 (anode electrode 303 was arranged immediately above fuel receiving portion 307). Similarly, on the cathode gas diffusion layer, second separator 304 was stacked such that its groove-formed surface faced the cathode gas diffusion layer, and second space 310 between second walls 312 was arranged immediately below second concave portion 308 (cathode electrode 302 was arranged immediately below oxidant receiving portion 306). Alkaline fuel cell 300 was obtained by fastening first separator 305 and second separator 304 with a bolt and a nut. The thermocouple was inserted into the hole for attaching the thermocouple in second separator 304.

(2) Fabrication of Alkaline Fuel Cell System

A double plunger pump (AL12-33) prepared as first heat medium circulation apparatus 402 and first and second inner-cell heat medium flow channels 321, 322 were connected using outer-cell heat medium flow channel 401 (a pipe manufactured by SUS) as shown in FIG. 9. Further, outer-cell heat medium flow channel 401 was partially immersed in an oil bath prepared as first heat exchange portion 500 to construct the first heat medium flow channel in which water as the first heat medium was circulated, and thus an alkaline fuel cell system was obtained. A thermometer and a heater were installed in the oil bath to control the temperature of the first heat medium to a desired temperature.

(3) Evaluation of Heat Exchange Efficiency and Power Generation Characteristics of Alkaline Fuel Cell System The alkaline fuel cell system was placed under a room temperature environment. Water (the first heat medium) within the first heat medium flow channel whose temperature was adjusted to 40° C. by first heat exchange portion 500 was circulated using first heat medium circulation apparatus 402, and the water was circulated and passed through first inner-cell heat medium flow channel 321 and second inner-cell heat medium flow channel 322. Five minutes after first heat medium circulation apparatus 402 had started operation, the temperature within alkaline fuel cell 300 reached 40° C.

Thereafter, humidified $H_2$ gas (relative humidity: 95%) was supplied to fuel receiving portion 307 of alkaline fuel cell 300 at a flow rate of 200 mL/min., and non-humidified air (relative humidity: 50%) was supplied to oxidant receiving portion 306 at a flow rate of 500 mL/min First separator 305 and second separator 304 were electrically connected, and power generation was performed at an extraction current value of 600 mA/cm$^2$. A cell resistance and a cell voltage measured after a lapse of 20 minutes since power generation was started, using a potentiostat/galvanostat (AUTOLAB PGSTAT30/FRA2 and AUTOLAB BSTR10A manufacture by ECO CHEMI), were 0.55 V and 150 mΩcm$^2$, respectively.

In addition, an experiment identical to that described above was conducted, using an alkaline aqueous solution as the first heat medium. The alkaline fuel cell system was placed under a room temperature environment. A 1 mol/L KOH aqueous solution (the first heat medium) within the first heat medium flow channel whose temperature was adjusted to 40° C. by first heat exchange portion 500 was circulated using first heat medium circulation apparatus 402, and the alkaline aqueous solution was circulated and passed through first inner-cell heat medium flow channel 321 and second inner-cell heat medium flow channel 322. Five minutes after first heat medium circulation apparatus 402 had started operation, the temperature within alkaline fuel cell 300 reached 40° C.

Thereafter, humidified $H_2$ gas (relative humidity: 95%) was supplied to fuel receiving portion 307 of alkaline fuel cell 300 at a flow rate of 200 mL/min., and non-humidified air (relative humidity: 50%) was supplied to oxidant receiving portion 306 at a flow rate of 500 mL/min. First separator 305 and second separator 304 were electrically connected, and power generation was performed at an extraction current value of 600 mA/cm$^2$. Ten minutes after power generation had been started, a cell voltage of 0.57 V was exhibited. The cell resistance on this occasion was 150 m$\Omega$cm$^2$.

Comparative Example 5

(1) Fabrication of Alkaline Fuel Cell System

An alkaline fuel cell was fabricated as in Example 5, except for using the first separator including a flow channel formed inside the first separator as first inner-cell heat medium flow channel 321 instead of first concave portion 309, and using the second separator including a flow channel formed inside the second separator as second inner-cell heat medium flow channel 322 instead of second concave portion 308. However, installation of first walls 313 and second walls 312 was omitted. Subsequently, using the alkaline fuel cell, an alkaline fuel cell system was fabricated as in Example 5.

The first inner-cell heat medium flow channel in the first separator and the second inner-cell heat medium flow channel in the second separator are each formed at a substantially central portion in the thickness direction of each separator, by attaching a member having a heat medium flow channel formed in its surface and a flat plate member by diffusion bonding, and the width and the depth of each flow channel are the same as those of first concave portion 309 and second concave portion 308 in the separators used in Example 5. Further, the shape of each flow channel is also the same as that of first concave portion 309 and second concave portion 308, and has a shape as shown in FIG. 11 when each separator is viewed from above.

(2) Evaluation of Heat Exchange Efficiency and Power Generation Characteristics of Alkaline Fuel Cell System The alkaline fuel cell system was placed under a room temperature environment. Water (the first heat medium) within the first heat medium flow channel whose temperature was adjusted to 40° C. by first heat exchange portion 500 was circulated using first heat medium circulation apparatus 402, and the water was circulated and passed through first inner-cell heat medium flow channel 321 and second inner-cell heat medium flow channel 322. Seven minutes after first heat medium circulation apparatus 402 had started operation, the temperature within the alkaline fuel cell reached 40° C.

Thereafter, humidified $H_2$ gas (relative humidity: 95%) was supplied to fuel receiving portion 307 of the alkaline fuel cell at a flow rate of 200 mL/min., and non-humidified air (relative humidity: 50%) was supplied to oxidant receiving portion 306 at a flow rate of 500 mL/min. The first separator and the second separator were electrically connected, and power generation was performed at an extraction current value of 600 mA/cm$^2$. A cell resistance and a cell voltage measured after a lapse of 20 minutes since power generation was started were 0.52 V and 170 n$\Omega$cm$^2$, respectively.

What is claimed is:

1. An alkaline fuel cell, comprising:
   a membrane electrode assembly including an anion conductive electrolyte membrane, an anode electrode stacked on a first surface of said anion conductive electrolyte membrane, and a cathode electrode stacked on a second surface opposite to said first surface of said anion conductive electrolyte membrane;
   a first separator stacked on said anode electrode, at least including a fuel receiving portion for receiving a fuel;
   a second separator stacked on said cathode electrode, at least including an oxidant receiving portion for receiving an oxidant; and
   an alkaline aqueous solution supply portion for bringing an alkaline aqueous solution into contact with only said anion conductive electrolyte membrane of said membrane electrode assembly.

2. The alkaline fuel cell according to claim 1, wherein said alkaline aqueous solution supply portion includes at least one of a first alkaline aqueous solution supply portion and a second alkaline aqueous solution supply portion, the first alkaline aqueous solution supply portion being provided for bringing the alkaline aqueous solution into contact with only said first surface of said anion conductive electrolyte membrane of said membrane electrode assembly, the second alkaline aqueous solution supply portion being provided for bringing the alkaline aqueous solution into contact with only said second surface of said anion conductive electrolyte membrane of said membrane electrode assembly.

3. The alkaline fuel cell according to claim 2, wherein said first alkaline aqueous solution supply portion includes
   a first concave portion provided in a surface of said first separator on a side facing said anion conductive electrolyte membrane, and
   a first space interposed between said first concave portion and said anion conductive electrolyte membrane, and sandwiched between first walls provided at peripheral edges of the space to extend from the surface of said first separator on the side facing said anion conductive electrolyte membrane to said first surface of said anion conductive electrolyte membrane.

4. The alkaline fuel cell according to claim 3, wherein
   said fuel receiving portion includes a third concave portion provided in the surface of said first separator on the side facing said anion conductive electrolyte membrane, and
   said first concave portion is a concave portion independent from said third concave portion, provided in at least a portion of a periphery of said third concave portion.

5. The alkaline fuel cell according to claim 2, wherein said second alkaline aqueous solution supply portion includes
   a second concave portion provided in a surface of said second separator on a side facing said anion conductive electrolyte membrane, and
   a second space interposed between said second concave portion and said anion conductive electrolyte membrane, and sandwiched between second walls provided at peripheral edges of the space to extend from the surface of said second separator on the side facing said anion conductive electrolyte membrane to said second surface of said anion conductive electrolyte membrane.

6. The alkaline fuel cell according to claim 4, wherein
said oxidant receiving portion includes a fourth concave portion provided in the surface of said second separator on the side facing said anion conductive electrolyte membrane, and
said second concave portion is a concave portion independent from said fourth concave portion, provided in at least a portion of a periphery of said fourth concave portion.

7. The alkaline fuel cell according to claim 1, wherein said first separator and said second separator have a current collecting function.

8. An alkaline fuel cell, comprising:
a membrane electrode assembly including an anion conductive electrolyte membrane, an anode electrode stacked on a first surface of said anion conductive electrolyte membrane, and a cathode electrode stacked on a second surface opposite to said first surface of said anion conductive electrolyte membrane;
a first separator stacked on said anode electrode, at least including a fuel receiving portion for receiving a fuel;
a second separator stacked on said cathode electrode, at least including an oxidant receiving portion for receiving an oxidant; and
a liquid water supply flow channel for supplying liquid water to said anion conductive electrolyte membrane,
wherein said liquid water supply flow channel includes a space in contact with only said anion conductive electrolyte membrane of said membrane electrode assembly, said space being interposed between said first separator or said second separator and said anion conductive electrolyte membrane, and sandwiched between elastic walls provided at peripheral edges of the space to extend from a surface of said first separator or said second separator on a side facing said anion conductive electrolyte membrane to the surface of said anion conductive electrolyte membrane.

9. The alkaline fuel cell according to claim 8, wherein said liquid water supply flow channel includes at least one of a first liquid water supply flow channel and a second liquid water supply flow channel, the first liquid water supply flow channel including a first space in contact with only said first surface of said anion conductive electrolyte membrane of said membrane electrode assembly, said first space being interposed between said first separator and said anion conductive electrolyte membrane, and sandwiched between first elastic walls provided at peripheral edges of the space to extend from the surface of said first separator on the side facing said anion conductive electrolyte membrane to said first surface of said anion conductive electrolyte membrane, the second liquid water supply flow channel including a second space in contact with only said second surface of said anion conductive electrolyte membrane of said membrane electrode assembly, said second space being interposed between said second separator and said anion conductive electrolyte membrane, and sandwiched between second elastic walls provided at peripheral edges of the space to extend from the surface of said second separator on the side facing said anion conductive electrolyte membrane to said second surface of said anion conductive electrolyte membrane.

10. The alkaline fuel cell according to claim 9, wherein
said first liquid water supply flow channel includes a first concave portion provided in the surface of said first separator on the side facing said anion conductive electrolyte membrane, and said first space interposed between said first concave portion and said anion conductive electrolyte membrane, and
said second liquid water supply flow channel includes a second concave portion provided in the surface of said second separator on the side facing said anion conductive electrolyte membrane, and said second space interposed between said second concave portion and said anion conductive electrolyte membrane.

11. The alkaline fuel cell according to claim 10, wherein
said fuel receiving portion includes a third concave portion provided in the surface of said first separator on the side facing said anion conductive electrolyte membrane, and
said first concave portion is a concave portion independent from said third concave portion, provided in at least a portion of a periphery of said third concave portion.

12. The alkaline fuel cell according to claim 10, wherein
said oxidant receiving portion includes a fourth concave portion provided in the surface of said second separator on the side facing said anion conductive electrolyte membrane, and
said second concave portion is a concave portion independent from said fourth concave portion, provided in at least a portion of a periphery of said fourth concave portion.

13. The alkaline fuel cell according to claim 8, wherein said first separator and said second separator have a current collecting function.

* * * * *